US011055759B1

(12) United States Patent
Natesh et al.

(10) Patent No.: US 11,055,759 B1
(45) Date of Patent: Jul. 6, 2021

(54) COLOR SELECTION FOR IMAGE MATCHING VISUAL SEARCH

(71) Applicant: A9.com, Inc., Palo Alto, CA (US)

(72) Inventors: Aishwarya Natesh, Mountain View, CA (US); Pinkee Rasik Patel Gupta, San Mateo, CA (US); Andrea Zehr, Palo Alto, CA (US); Sharmila Nagaraja Reddy, Fremont, CA (US); Shruthi R. Bathina, Sunnyvale, CA (US); Daniya Zamalieva, Mountain View, CA (US)

(73) Assignee: A9.com, Inc., Palo Alto, CA (US)

( * ) Notice: Subject to any disclaimer, the term of this patent is extended or adjusted under 35 U.S.C. 154(b) by 236 days.

(21) Appl. No.: 15/696,011

(22) Filed: Sep. 5, 2017

(51) Int. Cl.
| | |
|---|---|
| *G06Q 30/06* | (2012.01) |
| *G06Q 30/00* | (2012.01) |
| *G06T 7/90* | (2017.01) |
| *G06F 16/583* | (2019.01) |
| *G06F 16/9535* | (2019.01) |

(52) U.S. Cl.
CPC ..... *G06Q 30/0623* (2013.01); *G06F 16/5838* (2019.01); *G06F 16/9535* (2019.01); *G06Q 30/018* (2013.01); *G06Q 30/0643* (2013.01); *G06T 7/90* (2017.01)

(58) Field of Classification Search
CPC . G06Q 30/0601–0645; G06Q 30/0623; G06Q 30/018; G06T 7/90; G06F 16/9535
See application file for complete search history.

(56) References Cited

U.S. PATENT DOCUMENTS

| 9,460,157 | B2 * | 10/2016 | Vuong | G06Q 30/0601 |
| 9,916,613 | B1 * | 3/2018 | Domer | G06Q 30/0621 |
| 2003/0065578 | A1 * | 4/2003 | Peyrelevade | A45D 44/005 |
| | | | | 705/14.54 |
| 2008/0082426 | A1 * | 4/2008 | Gokturk | G06Q 30/0625 |
| | | | | 705/26.62 |
| 2012/0045121 | A1 * | 2/2012 | Youngman | G06Q 30/0601 |
| | | | | 382/162 |
| 2013/0300761 | A1 * | 11/2013 | Ahmed | G01J 3/463 |
| | | | | 345/595 |

(Continued)

OTHER PUBLICATIONS

"Stepania, Der Arka, '7 Tips for Tagging Products With Hotspots', publitas.com, Apr. 18, 2014" (Year: 2014).*

*Primary Examiner* — William J Allen
*Assistant Examiner* — Maria S. P. Heath
(74) *Attorney, Agent, or Firm* — Hogan Lovells US LLP

(57) ABSTRACT

A color selection image matching system can receive, from a computing device, image data captured by a camera in the user device, where the image data includes one or more colors. The computing device can extrapolate a subset of the colors and receive an indication of a target color to initiate a product search based on the target color. The subset of colors may be determined based on other image data, and selectable color elements may be generated for the subset of colors. In some embodiments, the system may generate a palette of colors visually similar to the target color. The target color and/or palette of colors can be cross-referenced with products colors, based on standardized or quantitative color descriptors, to determine relevant product search results matching the target color, which may be displayed on the user device.

18 Claims, 16 Drawing Sheets

(56) References Cited

U.S. PATENT DOCUMENTS

| | | | |
|---|---|---|---|
| 2014/0075361 A1* | 3/2014 | Reynolds | G06F 3/04847 |
| | | | 715/771 |
| 2014/0254927 A1* | 9/2014 | Bhardwaj | G06Q 30/0643 |
| | | | 382/165 |
| 2015/0235389 A1* | 8/2015 | Miller | G06Q 30/0627 |
| | | | 345/594 |
| 2016/0104303 A1* | 4/2016 | Domer | G06K 9/4652 |
| | | | 382/164 |
| 2016/0300290 A1* | 10/2016 | Bhardwaj | G06Q 30/0631 |
| 2018/0075523 A1* | 3/2018 | Sartori Odizzio | |
| | | | G06Q 30/0643 |

* cited by examiner

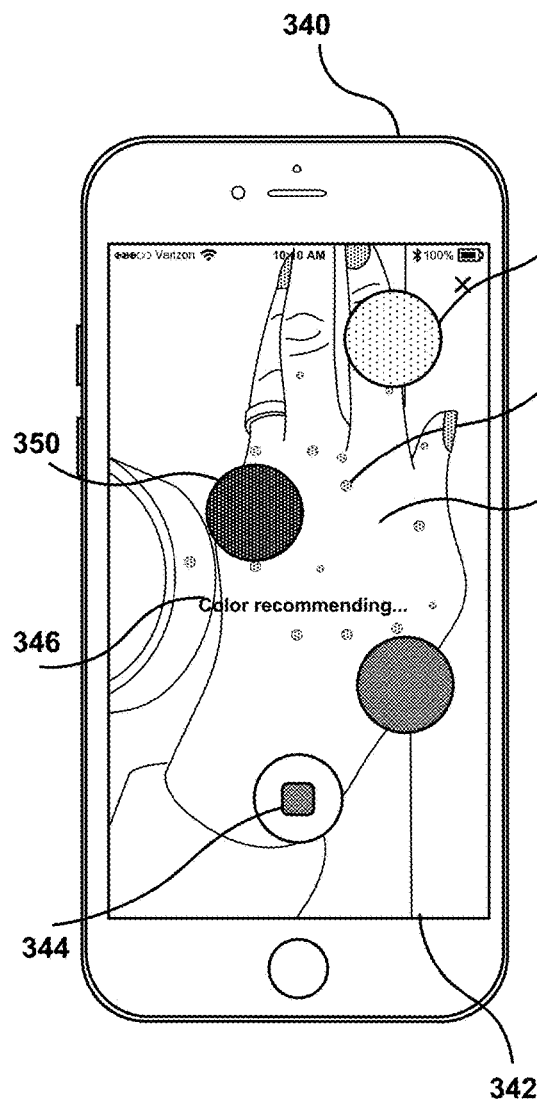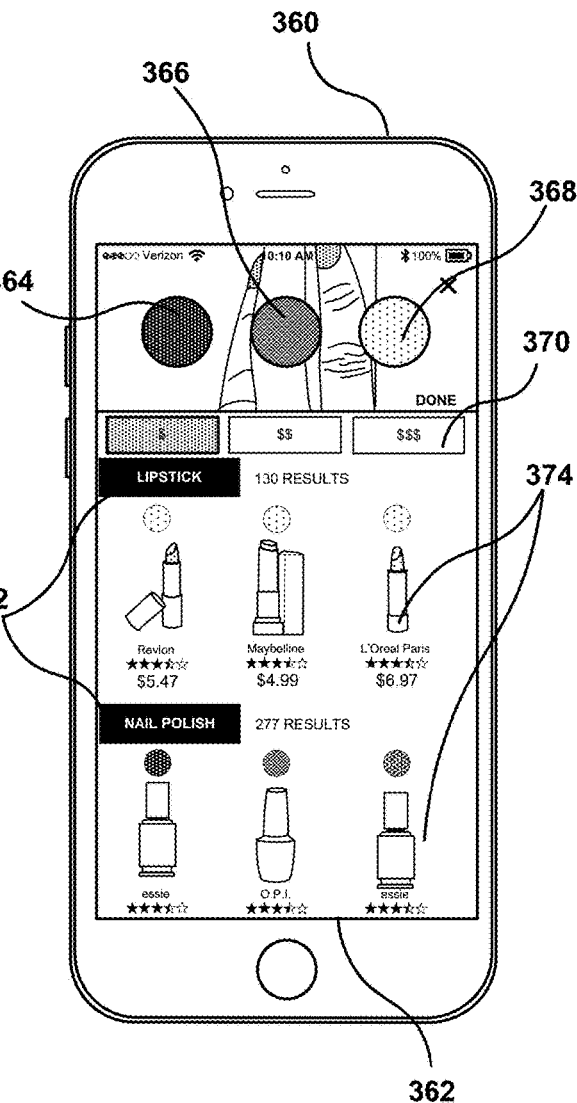
FIG. 3C
FIG. 3D

COLOR SELECTION FOR IMAGE MATCHING VISUAL SEARCH

BACKGROUND

Users are increasingly utilizing personal computing devices to research, locate, and obtain various types of information. For example, users may utilize a search engine, via a laptop or mobile phone, to locate information about various items, such as items offered through an electronic marketplace. Conventional approaches to locating content involve utilizing a query to obtain results matching one or more terms of the query, navigating by page or category, or other such approaches that rely primarily on a word or category used to describe an item. Such approaches can make it difficult to locate items based on appearance or aesthetic criteria, such as a specific color or complementary colors. For example, different brands for the same product may offer the product in different shades of "red," and thus, users can have difficulty locating the appropriate items in the color they want, or may at least have to navigate through many irrelevant or inaccurate results before locating an item of interest. While approaches exist for matching images, these typically match based on the entire contents of the image or specific items in the image, not colors identified in the image, which can result in matches that do not correspond to items of interest in a specific color.

BRIEF DESCRIPTION OF THE DRAWINGS

Various embodiments in accordance with the present disclosure will be described with reference to the drawings, in which:

FIGS. 3A, 3B, 3C, and 3D illustrate stages of an example process for using an image, video, or scan of a scene to conduct a color selection image match visual search for products in accordance with various embodiments.

DETAILED DESCRIPTION

Figure 1:
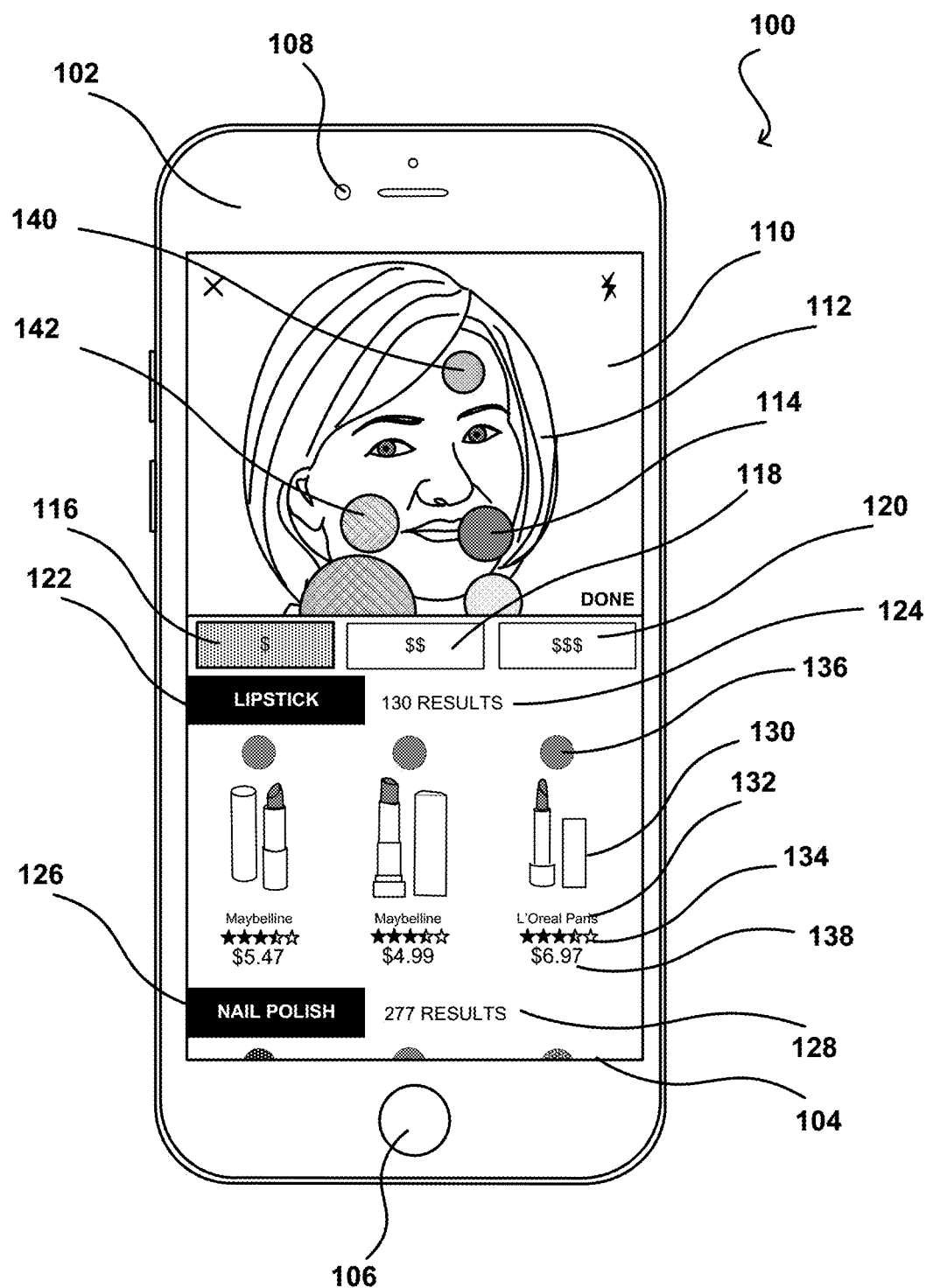
FIG. 1 illustrates an example of an approach that can perform a color selection image match visual search based on selectable color elements that can be utilized in accordance with various embodiments.

Systems and methods in accordance with various embodiments of the present disclosure may overcome one or more of the aforementioned and other deficiencies experienced in conventional approaches to locating and/or providing digital content in an electronic environment. In particular, various embodiments provide for the determination of one or more representative color swatch regions of an image that can be used to provide selectable color elements. The selectable color elements may then be used to locate products with colors matching or substantially visually similar to the color of the selected color swatch element. Various products across different brands may offer their products in the same color, but different brands may use different color names or have different color formulas for the same name, which can make searching for products in a specific color difficult using conventional techniques. Approaches discussed herein provide for the determination of such selectable color elements with minimal processing requirements, and enable matches to be performed using the selected color to provide products of similar colors despite various color titles and names across brands.

In various embodiments, multiple methods may be used to determine candidate image swatch regions and determine a subset of colors in the image to generate selectable color elements for. For example, in an image of a person, these regions can be based upon head or upper body locations as determined by an appropriate object detection algorithm, or can be based upon locating regions of skin color and selecting other regions that are likely to correspond to apparel worn by the person represented in the image. Other methods can be used as well, for example, determining color swatch regions based on a foreground region, background region, or the area of a particular color relative to other colors or the entire image. The color swatch regions then can be analyzed to determine a subset of colors to generate selectable color elements for a user to select a target color for a search.

A product search for products with the target color may include analyzing the target color and identifying matching product colors based on quantitative measurements of distance between colors and/or matching colors codes (e.g., hex code). In some embodiments a color palette of similar colors to the target colors may be generated. The palette of colors and/or target color may be cross-referenced with product colors and their corresponding products. Searching based on color as opposed to keywords that include colors results in more accurate and relevant searches because of inconsistencies of color naming and colors across different products and brands. As such, searching, comparing, and matching based on standardized color codes and databases of colors and products provides a solution to the problems associated with searching for a specific color by keyword. Various other functions and advantages are described and suggested below as may be provided in accordance with the various embodiments.

Systems and methods in accordance with various embodiments of the present disclosure overcome one or more of the above-described deficiencies and other deficiencies in conventional approaches to searching for products by color. In particular, various embodiments of the present disclosure can provide a method for providing products of a target color or palette of colors that are visually similar to the target color selected from an image captured by a device.

FIG. 1 illustrates an example 100 illustrating how an example mobile device can be utilized to attempt to provide products based on a subset of colors identified in an image in accordance with various embodiments. In this example, the mobile computing device 102 can include at least one camera 108 that can capture images and video from both sides of the mobile computing device. The mobile computing device 102 may also include control button(s) 106 which can be utilized to capture the image, for example, or perform other functions. Other ways in which a user can interact with the mobile computing device 102 can be through gestures made on a touchscreen 104 of the mobile computing device 102. The touchscreen 104, in conjunction with functionality provided by an application running on the mobile computing device to perform color selection image match searching, can enable a user to zoom, crop, select, adjust color or light settings, or other image-adjusting functions. In this example, an image 110 is obtained and includes a representation of a woman's face 112. It can be the case that a user likes the cosmetics that this woman uses and wants to locate information about the color of her foundation or lipstick, or find similar or complementary colors for nail polish.

As illustrated, the woman's face 112 includes various image regions that have different colors. For example, her hair is likely a different color from her face, eyes, or lips. Based on determining the various image regions and converting them into color swatch regions by identifying the color of that particular image region, selectable color element(s) 114 may be generated. The user may select the color element 114, which represents the color of her lips, to generate a visual color search for products that match the target color represented by the selected selectable color element 114. The search may provide results classified into different categories, such as "Lipstick" 122 and "Nail Polish" 126. It may then be determined that because the selectable color element 114 for the lips was selected by the user, that "Lipstick" may be the default or first category to be displayed in the search results. The search results may also provide various filters, for example products within a lower price range 116, a mid-price range 118, or a higher price range 120. The search results may also provide a number of results for each category, for example "130 results" 124 for "Lipstick" 122 and "277 results" 128 for "nail Polish" 126. Under each category, the respective products can be shown, such as a lipstick 130, with corresponding product information, such as a color swatch 136, a brand 132, a rating 134, and a price 138.

In determining the subset of colors to generate selectable color elements, various techniques may be implemented by a color selection image matching system. Various conventional approaches can attempt to separate out a foreground object from the background objects, but such approaches can be difficult, computationally expensive, and not highly accurate. While attempts can be made to select portions of the image for matching, it can be seen that different regions of the woman's face 112 can include very different shapes and colors. If the user is interested in items or products matching the color of the cheek represented by selectable color element 142, which may be different from the color of the forehead, represented by selectable color element 140. However, because the forehead and cheek are not separated by boundaries that may be detectable by an image scan, it may be difficult to determine that different selectable color elements may need to be generated. Instead of merely using boundaries, techniques to determine the subset of colors may include an analysis of the color gradient, shading, tone, color standards, and other color characteristics. For example, if there is too much of a delta in a color similarity score between a color of the cheek and the color of the forehead, then each image region will be given a separate selectable color element. However, if they are similar enough in color, then the woman's face (cheek and forehead) may be represented by one selectable color element. In this example, instead of the lips, the user can select the selectable color element corresponding to the cheek color as the target color for the search. The search results may then subsequently be updated to reflect products that match the target color of the cheek. It should be noted that, although a woman's face is used for a search for cosmetics in this example, various other types of media (e.g., video, scan, image) can be used to search for other items or objects, cosmetic related or not, can benefit from aspects of the various embodiments as should be apparent in light of the teachings and suggestions contained herein.

Figure 2:
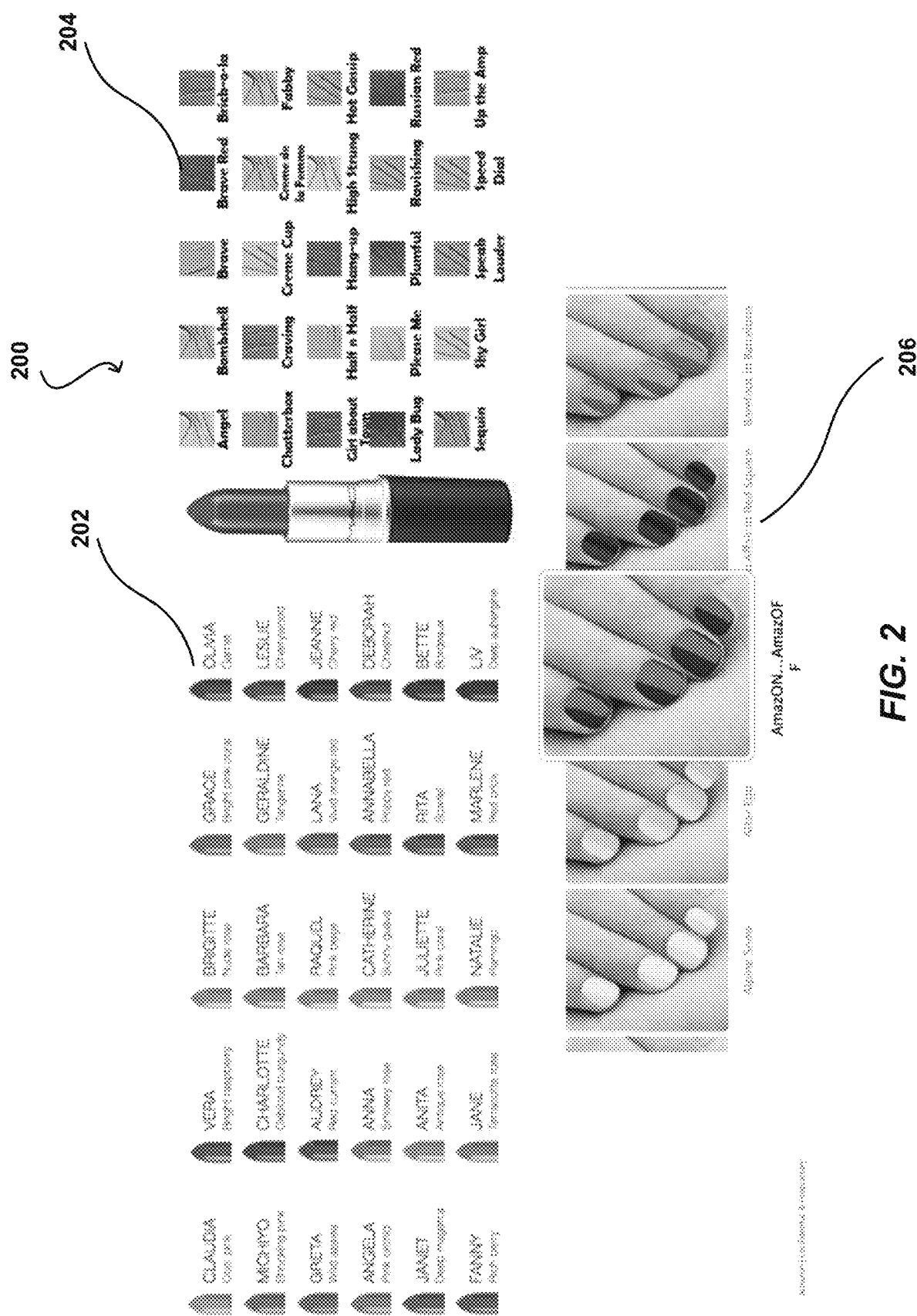
FIG. 2 illustrates an example of the variety of color identifiers and descriptors for different brands of a product in accordance with various embodiments.

In this example for beauty products, conventionally, different beauty products and brands come in a wide variety of colors, as shown in FIG. 2. However, the naming of the colors may not be consistent, standardized, intuitive, or self-explanatory. For example, in FIG. 2, various color palettes 200 for corresponding products are shown across different brands. A lipstick 202 may have a color name or identifier of "Olivia" when the color descriptor itself is "Garnet." The color name "Olivia" provides no information to a user as to what color that is without looking at the color, and a user cannot search for other items by using the keyword "Olivia" as a color. Alternatively, a user could use the color descriptor "garnet" to search for other items that are a garnet color, however different brands or products may have different shades for garnet. What may be classified as garnet for a lipstick 202 may actually be the same color as lipstick 204 named "Deep Red," as an example. In another example what is described as "red" for one brand may be a more orange-red compared to the "red" of another brand, which may be a more blue-red. The color descriptor may include other information, such as a color standard (e.g., Pantone), hexadecimal/HTML color code, RGB code, or CMYK code. As such, it may be difficult for users to search for the same color of product in another brand because of the different color names and identifiers, and the color data, such as the descriptor, may be analyzed to determine the actual color to initiate a visual search. The visual search may be across different brands, or even different products, like nail polish, where a red nail polish is called "An Affair in Red Square" 206.

Systems and methods in accordance with various embodiments address these and other deficiencies with existing approaches by providing automated processes for determining subsets of color for generating selectable color elements that can be used to initiate a search and locate content of interest to a user. These approaches can be executed relatively cheaply and inexpensively by using relatively computationally inexpensive steps to determine regions of high probability from which color swatches can be extracted for matching. The regions can be processed in different ways, such as through regression processing or probability map generation, in order to determine color swatches with a high probability of being of interest to the user, and thus should have selectable color elements generated for them. The types and/or selection of steps utilized can depend at least in part upon the types or categories of images or objects to be analyzed and/or matched, as steps useful for locating a color of a dress worn by a person can be very different if the person is partially covered by a shadow or if the entire image is captured in poor lighting.

Figure 3A:
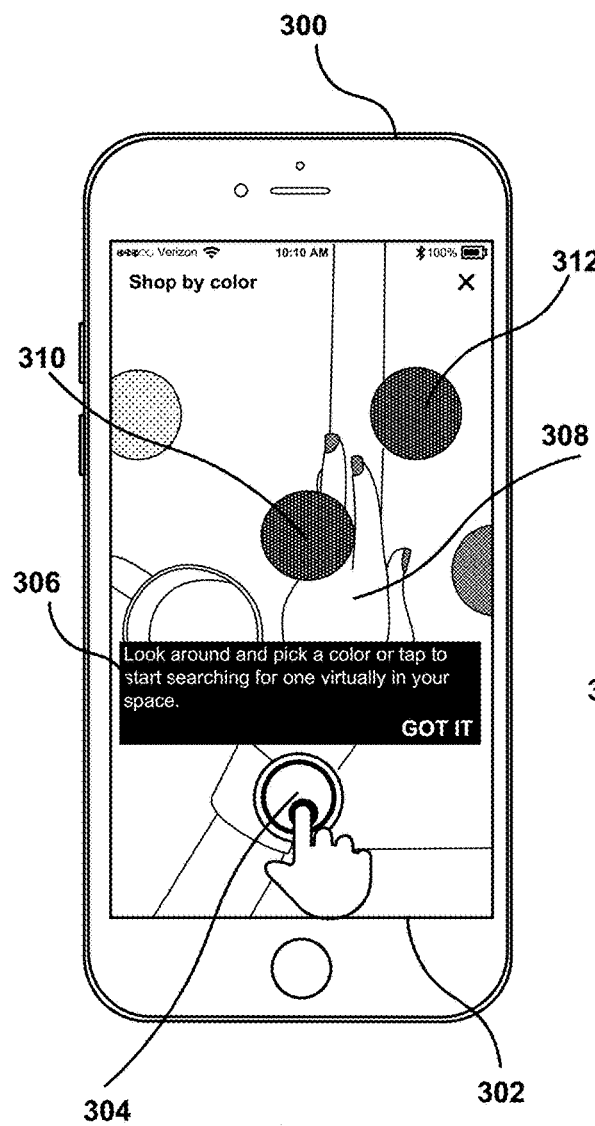

As mentioned, a difficulty with processing image or video input relates to the ability to precisely segment out an item of interest, such as clothing and body features with varying shapes and colors, from the surrounding background or other objects. FIG. 3A illustrates an initial stage of an example process for using an image to conduct a color selection image match visual search for products in accordance with various embodiments. This can be particularly difficult for items such as items that are change in shape and are moving, which changes its appearance and color or how it is otherwise presented in the image, such that a shape or contour detection algorithm may not provide sufficient accuracy. However, locating a reasonably-sized image patch, or "swatch" containing values for a contiguous subset of pixels, from the interior of the object of interest can often provide sufficient data for identifying a color of that particular image patch. In some embodiments, extracted swatches and their corresponding extracted colors can be used to build a database against which visual search queries can be executed, further providing for quick and accurate results with minimal processing requirements.

In FIG. 3A, a computing device 300 may include a touch screen 302, which the user can interact with. A user can interact with the computing device 300, through a software application executing on the computing device 300, to capture an image of a physical object, e.g., a hand 308. The software application may be provided by, and in communication with via the computing device, a color selection image matching system. The image can be captured using a camera in the computing device 300, for example. Additionally, in some embodiments, an image can be obtained from different source rather than being captured by the camera of the computing device 300. For example, an image could be obtained from a different user who shared an image with the user, for example. In another example, the image can be captured using, for example, the computing device 300 while viewing digital media, e.g., a movie, on the computing device 300.

The user can capture the image by taking a photo by clicking or interacting with the application at 304. The application of the color selection image matching system may provide instructions to the user displayed at 306 on the screen to indicate that the user can tap to select any of the selectable color elements 310 or 312. The selectable color elements represent a subset colors that have been extracted from the image. The subset of colors may be determined based on various image information extracted from the image, for example, the areas of color swatch regions, whether the object appears in the foreground or background, etc. In another embodiment, the user may select areas in the image for the color selection image matching system to generate selected color elements for colors shown in the user-selected areas. For example, selectable color element 310 may correspond to and represent a skin tone color of the hand 308. The selectable color element 312 may correspond to represent a color of the table that the hand 308 is resting on.

Figure 3B:
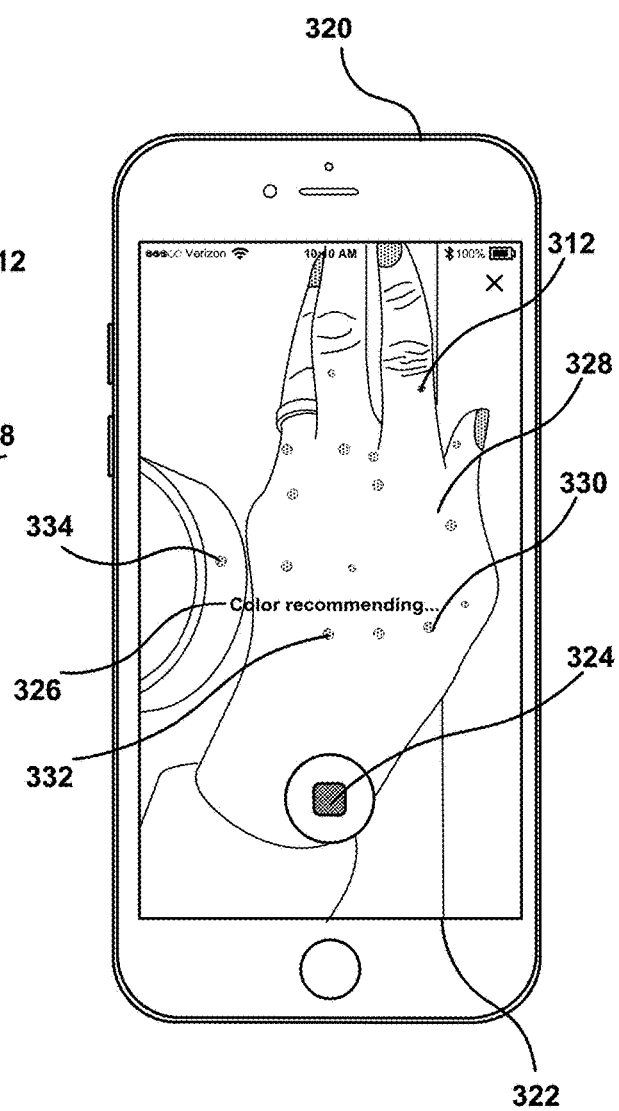

FIG. 3B illustrates an example of the computing device 300 initiating a process to extract colors from the image and providing a subset of color recommendations represented by selectable color elements. As shown on the display touchscreen 322 of computing device 320, the application may allow a user to interact with the application by tapping the icon 324 to scan a scene, record a video, or capture an image using a camera of the computing device 320. Regions of the image may be analyzed to extract the color of that area. For example, color analytical point 332, 330, and 328 may be extracting and analyzing various colors of hand 328. Color analytical point 334 may be extracting and analyzing the color of the object next to the hand 328. The application of the color selection image matching system may display a notification message 326 "Color Recommending" on the computing device 320 to indicate that the image is being analyzed for color recommendations.

In FIG. 3C, from color analytical points 354 and 348 presented on the display 342 of device 340, the color selection image matching application operating on computing device 340 may generate selectable color elements 350 and 352. The selectable color elements 350 and 352 represent colors that have been extracted from the analytical points 354 and 348. Extracting the colors representative of the image regions may be performed in a various ways. In one embodiment, extracting colors representative of image regions to determine a subset of colors may involve determining colors that predominate the image, for example, an area of a particular color relative to other colors or relative to the total area of the image (e.g., ratio or percentage). The image may be captured as a photo or a video taken by the user via button 344. To be included in the subset of colors, in some embodiments, it can be determined whether the ratio or percentage of a particular color is over a predetermined threshold. In another embodiment, the subset of colors may be determined by identifying whether an area of a particular color is over a predetermined threshold area (e.g., a minimal area of 100×100 pixels). In another embodiment, determining which colors to extract as the subset of colors may include identifying colors form objects in the foreground as opposed to the background. In another embodiment, a primary or focal object may be determined in the image (e.g., zoomed into an object), and all the colors of that object may be included in the subset of colors. In some embodiments, the threshold ratio, percentage, or area may be pre-determined by the color selection image matching system or may be preset by the user via the computing device. The computing device may then transmit this threshold to the color selection image matching system.

One or more selectable color elements may be selected, or alternatively, the subset of colors may serve as the target colors for the visual product search, as shown in FIG. 3D. The selectable color elements in FIG. 3C may be represented by the target colors 364, 366, and 368m presented on the display screen 362 of the user device 360. The target colors 364, 366, and 368 are then used to visually search for products that match those colors. The search results may be displayed on the touchscreen 362 of computing 360 for the user to select to purchase or view additional information. The search results may include a display of the products 374 that match the target colors 364, 366, and 368. The products 374 may be classified into various categories 372, in this example, lipsticks and nail polishes in any of the target colors 364, 366, or 368, or similar colors to the target colors. In another embodiment, the user may wish to search for products in colors complementary to the target colors. The search results may include various filters 370, such as price, as shown in FIG. 3D, but other filters may include popularity, ratings, or relevance (e.g., having a color most visually similar to the target color). The search results may also include various product information, such as the number of results, color descriptors or identifiers, brand, price, rating, and/or product image. The product search results may also be based in part on user preferences, demographic data, and history, for example, prior purchase, search, or browsing history. For example, if a user has purchased a lot of home items, then the color search results may return more home items as opposed to beauty products. In another example, if the user is a male, then the system may exclude cosmetics or feminine products from the color search results. User preferences can include preferences for color, products, brand, price range, etc.

Figure 4A:
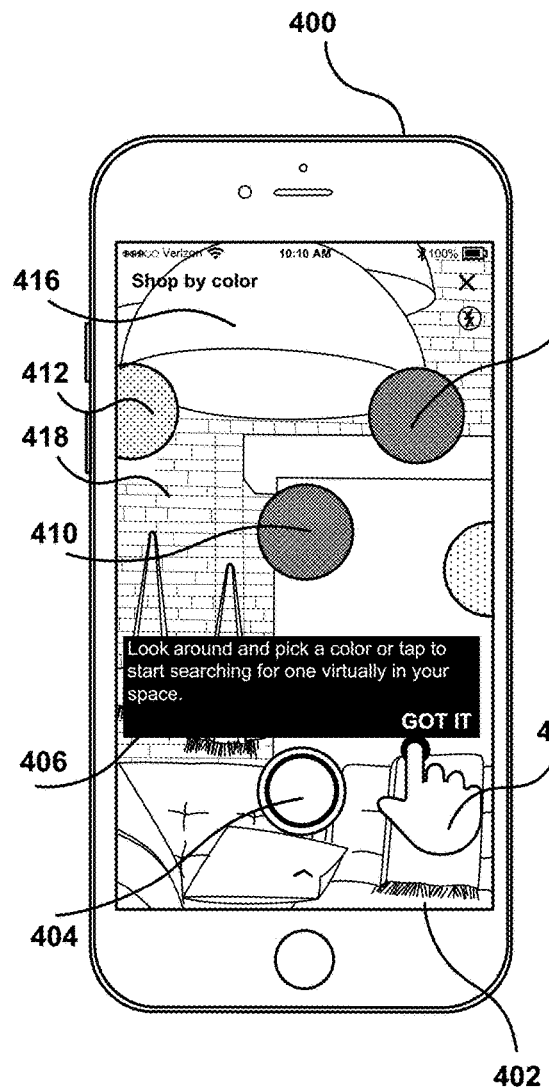
FIGS. 4A, 4B, and 4C illustrate stages of an example process for conducting, in an augmented reality space, to conduct a color selection image match visual search for products in accordance with various embodiments.

According to another embodiment, as shown in FIG. 4A, a computing device 400 having a display screen 402, for example a touch screen, may be used to provide an augmented reality (AR) or virtual space for the user. A user can interact with the computing device 400, through a software application for color selection image matching to capture an image or scan of a scene to create an AR space for the user to interact with. The image or video can be captured using a camera in the computing device 400 to display the AR space on touchscreen 402. The user can interact with AR space via the application of the color selection image matching system via button or icon 404 to capture an image or record a video, or navigate other elements of the application using his or her hand 408 to interact with the display screen 402 of device 400. The application may provide instructions to the user at 406 to indicate that the user can navigate virtually in the space and tap to select any of the selectable color elements 410, 412, and 414. The selectable color elements 410, 412, and 414 represent a subset colors that have been extracted from objects 416 and 418 in the AR space. For example, selectable color element 412 may correspond to and represent a color of light fixture 416. The selectable color element 410 may correspond to represent a color of the wall 418.

Figure 4B:
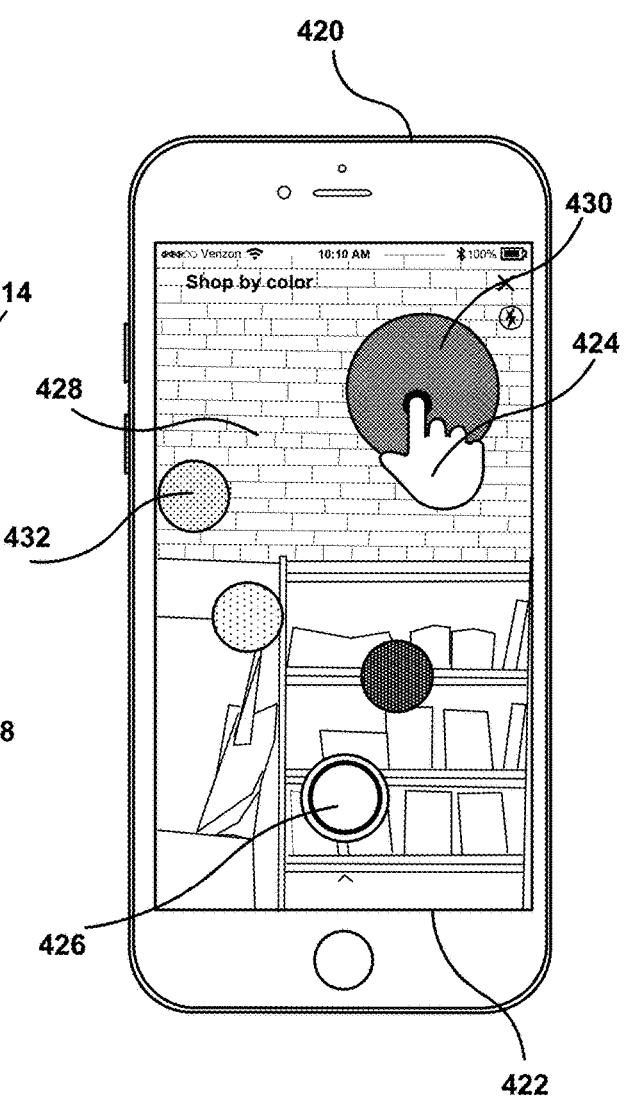

FIG. 4B illustrates an example of the computing device 400 providing a subset of color recommendations represented by selectable color elements 430 and 432. As shown on the display touchscreen 422 of computing device 420, the application may allow a user to interact with the application by tapping the icon 426 to scan a scene, record a video, or capture an image using a camera of the computing device 420. Regions of the image may be analyzed by the color selection image matching system to extract the color of that area as the user is navigating through the AR space. Selectable color elements 430 and 432 may be generated to represent a subset of colors extracted from the AR space. Extracting the colors representative of the image regions and generating the selectable color element for display may be performed in a various ways. In one embodiment, extracting colors representative of image regions to determine a subset of colors may involve determining colors that predominate the image, for example, an area of a particular color relative to other colors or relative to the total area of the image (e.g., ratio or percentage). In another embodiment, the subset of colors may be determined by identifying whether an area of a particular color is over a predetermined threshold area (e.g., a minimal area of 100×100 pixels). In another embodiment, determining which colors to extract as the subset of colors may include identifying colors from objects in the foreground as opposed to the background. In another embodiment, determining which colors to extract as the subset of colors may include identifying colors form objects in the foreground as opposed to the background. In another embodiment, a primary or focal object may be determined in the image (e.g., zoomed into an object), and all the colors of that object may be included in the subset of colors. In some embodiments, the threshold ratio, percentage, or area may be pre-determined by the color selection image matching system or may be preset by the user via the computing device. The computing device may then transmit this threshold to the color selection image matching system. The selectable color element may be adjusted in size based on the area of the image having that color. For example, selectable color element 450 may be displayed as larger since it is representative of the color of the wall 428 in the AR space. The user may be able to select the selectable color element 430 by tapping on it or another gesture using a stylus or finger 424. In some embodiments, the subset of colors may also be based in part on preferences or historical information of the user with respect to preferred colors of the user, previously selected colors, or previous color searches.

Figure 4C:
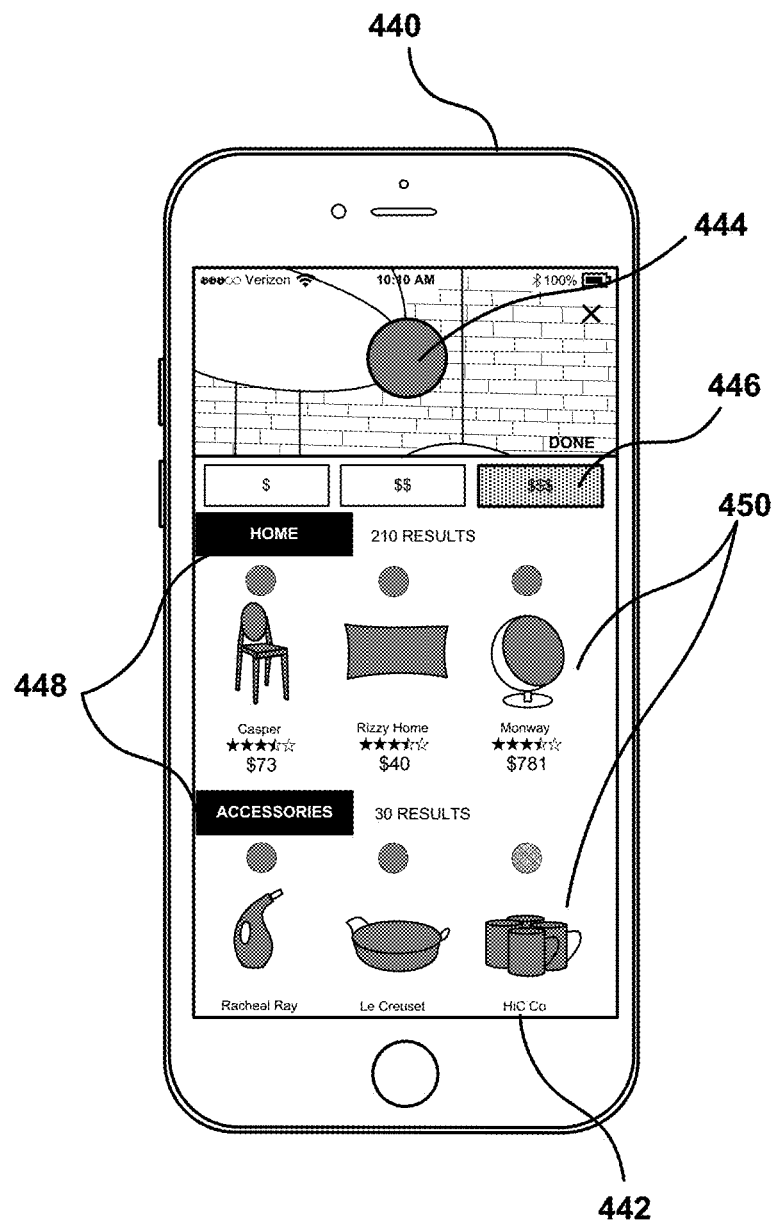

One or more selectable color elements may be selected, or alternatively, the subset of colors may serve as the target colors for the visual product search. Once the selectable color element is selected, as shown in FIG. 4C, the target color for the visual product search is determined. The selectable color element 430 in FIG. 4B may be represented by the target color 444 in FIG. 4C. The target color 444 may then be used to visually search for products that visually match, are similar to, or are complementary to the target color 444. The search results may be displayed on the touchscreen 442 of computing device 440 for the user to select to purchase or view additional information. The search results may include a display of the products 450 that substantially match, or are complementary to, the target color 444. The products 450 may be classified into various categories 448, in this example, home items and accessories. The search results may include various filters 446, such as price, popularity, or relevance (e.g., having a color most visually similar to the target color 444). The search results may also include various product information, such as a number of results, color descriptors or identifiers, brand, price, rating, and/or product image. The product search results may also be based in part on user preferences and history, for example, prior purchase, search, or browsing history.

Figure 5A:
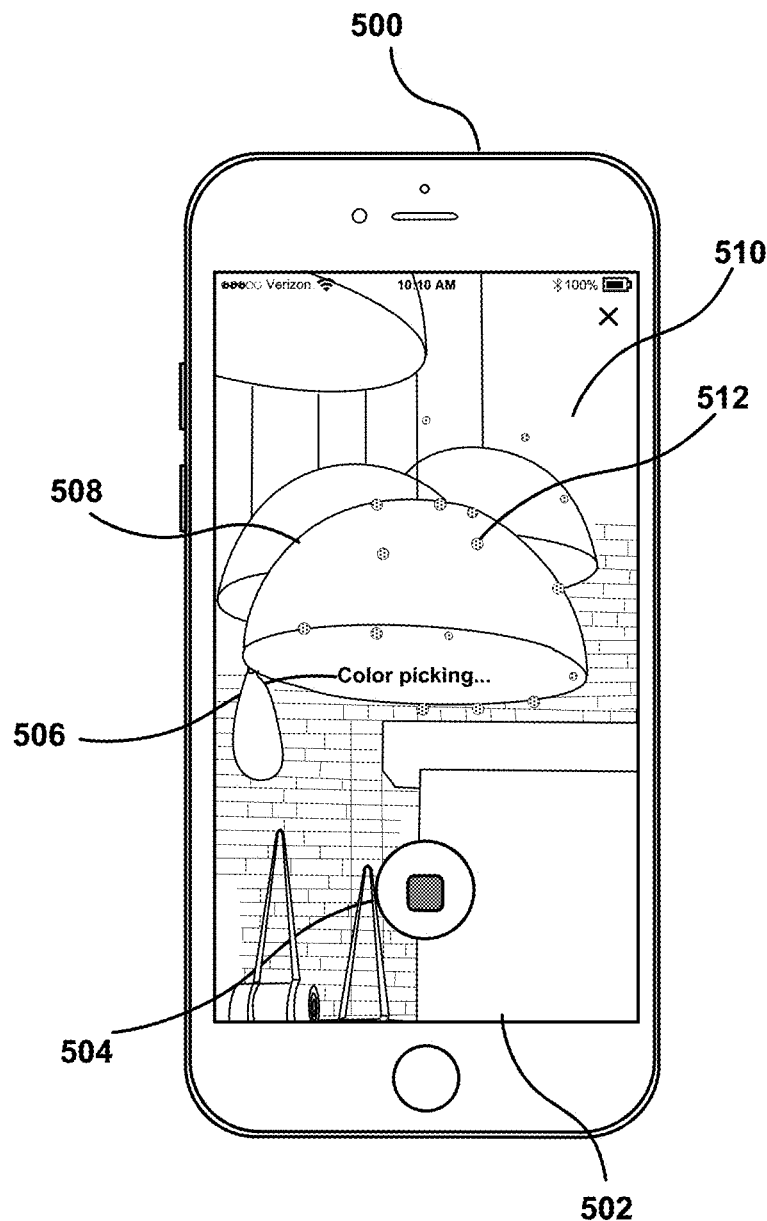
FIGS. 5A and 5B illustrate stages of an example process for determining what color(s) to generate selectable color elements for in accordance with various embodiments.

FIG. 5A illustrates an example of how to determine which color to generate a selectable color element according to various embodiments. The computing device 500 may be used to capture an image, take a video, or scan a scene 510 and in some embodiments, may be used in an AR space. The scene, space, image, or video 510 may be viewed on the touchscreen display 502 of the computing device. The display 502 may be enabled such that a user to interact with a color selection matching application via icon 504, for example, to record a video, take an image, or scan through a real or AR space. The color selection matching application may extrapolate data points 512 to extract image information about the scene 510 to determine a primary object 508 (e.g., lampshade). Image information may include boundary lines of the object to help calculate the area of that object to determine whether the object is a primary object of the scene because it covers a large area of the scene 510 displayed on the screen. In another example, the image information may include data on whether an object is in the foreground of the background. An object may be determined to be a primary object because it is in the foreground, even if it does not cover the largest area. In various embodiments, multiple data points 512 may be taken to extrapolate various data in various combinations to determine what color to pick based on what the primary object is. The application may provide a notification 506 that the application is "Color picking" so that the user will wait for a response from the application.

Figure 5B:
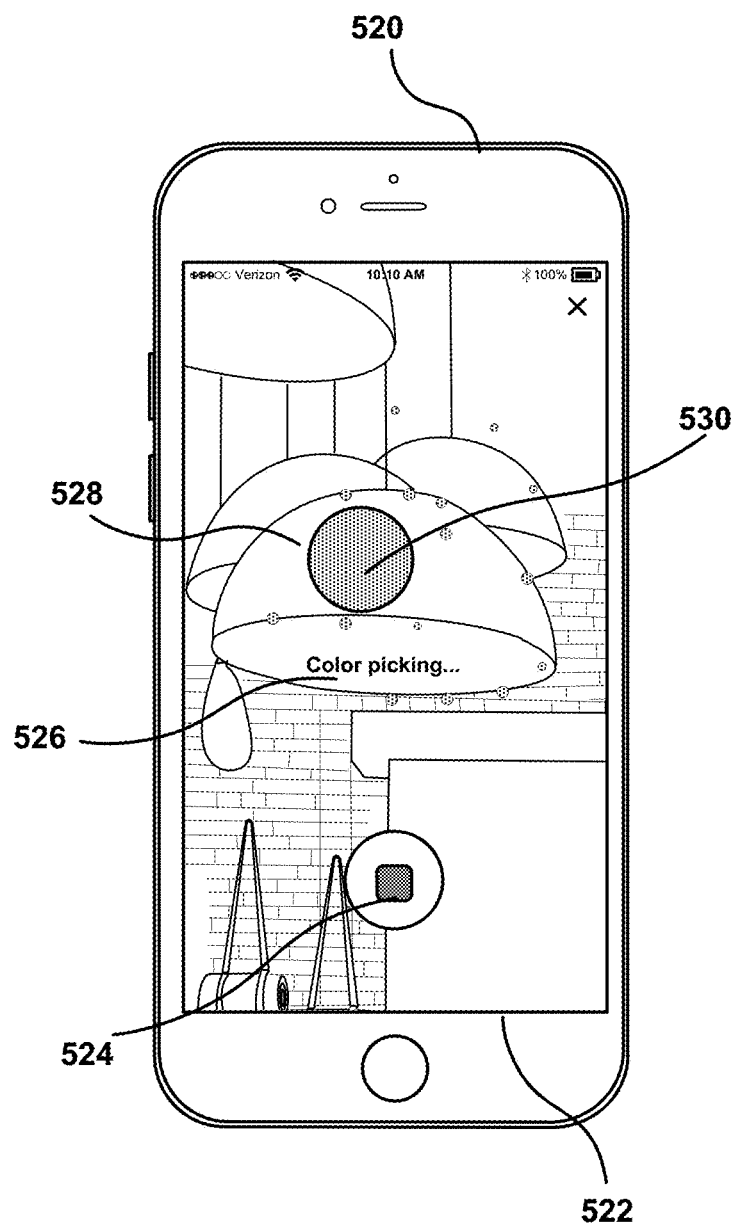

FIG. 5B illustrates an example of how to generate a selectable color element according to various embodiments. Once the primary object 528 is identified in the scene displayed on the screen 522 of the computing device 520, then it is determined what color that object is. The application may provide a notification to the user 526 that a color is being picked. When the color of the primary object is determined, the application can generate a selectable color element 530 that the user can select as a target color to initiate a visual product search based on the target color. In another embodiment, the selectable color elements may be generated for colors represented in areas of the image that are manually selected by the user. For example, the user may click or touch primary object 528 to indicate to the application to generate a selectable color element for the color of primary object 528.

Figure 6:
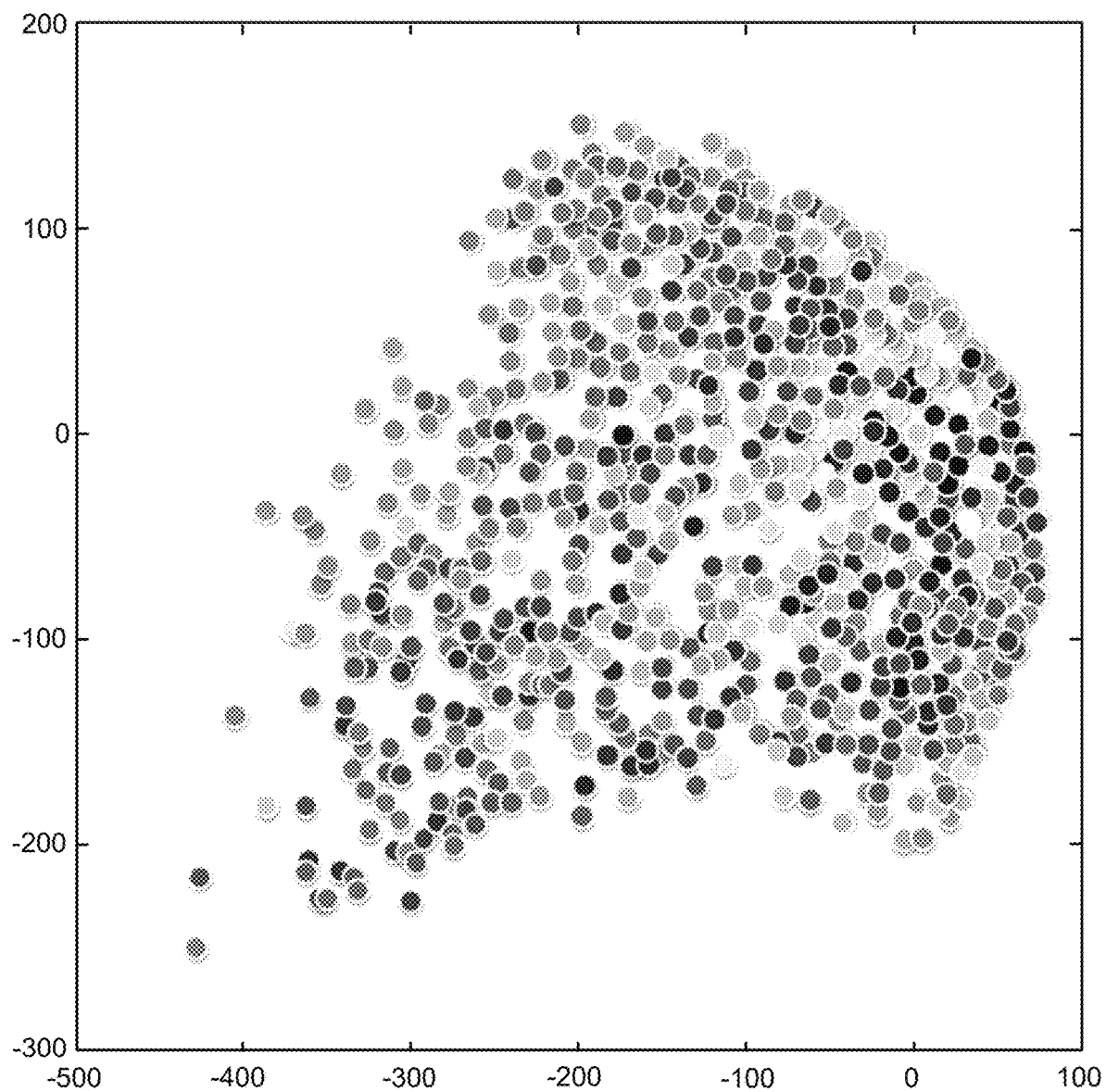
FIG. 6 illustrates an example color database map in accordance with various embodiments.

FIG. 6 illustrates a color palette histogram according to various embodiments. As mentioned above, selectable color elements are generated for a subset of colors extracted from the image, AR space, video, or scan. The selectable color elements represent target colors for the visual product search. However, it may not always be possible to find a sufficient number of products that match exactly the target color. Thus, according to various embodiments, to facilitate more search results for a user to select from, a color palette may be determined from the target color. The color palette can include a range of colors that are visually similar to the target color based on a color similarity score calculated for each color in relation to the target color. To generate the color palette, the color selection image matching system may access a product color database, including color descriptors and identifiers corresponding to potential products that may be returned as search results. The target color may be compared to colors within the product color database, and a color similarity score may be calculated, indicating a level of visual similarity, shade, or tone of the product color relative to the target color. The color histogram may be represented by International Commission on Illumination (CIE) color spaces, defining quantitative values and links between physical pure colors (i.e., wavelengths) in the electromagnetic visible spectrum and physiological perceived colors in human color vision. CIE color spaces illustrate mathematical relationships between colors, and can be particularly helpful in presenting true colors digitally (e.g., on illuminated displays of electronic devices) that match true colors as they are perceived in human color vision.

To identify visually similar colors, the color selection image matching system can, for example, compare the color descriptor that was received from the computing device as the selected selectable color element to a color descriptor of various products in the product color database. In some embodiments, the colors in the color database or at least some of the colors selected for the color palette may correspond to colors that have been determined to be popular colors. In some embodiments, the colors in the color database or at least some of the colors selected for the color palette may correspond to colors that have been selected by a curator.

A color descriptor (e.g., hex, RGB, or CMYK code) of the target color represented by the selected selectable color element can be compared with a color descriptor of colors in the color database using a distance measurement, e.g., dot product, to generate a visual similarity score. Product colors that satisfy a threshold visual similarity score can be selected as a color that is visually similar to a color described by the generated color descriptor. In another embodiment, product colors that have a color similarity score within a range may be included in the color palette. As a result, the target color and product colors similar to the target colors can be included in the palette of colors and correlated with their respective products to be returned in the search results. Thus, the palette of colors includes one or more colors that are visually similar to the target color represented by the selected selectable color element.

To compare the color content of a product and the target color, the color selection image matching system can measure the distance, e.g., dot product, between the respective color descriptors for the first and second images. Typically, the color descriptors are normalized vectors and determining a dot product of a first color descriptor and a second descriptor produces a distance that ranges between 0 and 1. The measured distance is a score that represents a visual similarity between colors in the first image and colors in the second image. The color descriptor for an image can be used to identify one or more colors that are visually similar to the colors in the image. For example, the product search system 505 can compare the color descriptor for the image, which describes a histogram of colors in the image, with respective color descriptors for one or more colors to generate respective visual similarity scores that measure a similarity between colors in the image and the color. Colors having a respective visual similarity score that satisfies a threshold can be selected as colors that are visually similar to colors that are in the image. The thresholds can vary depending on the type of comparison being performed. If seeking a high degree of similarity between two color descriptors, a high threshold, e.g., 0.8 or 0.9, can be selected. In contrast, if seeking a similarity between a first color and a range of colors that are still visually close to the first close, a lower threshold, e.g., a range of 0.4 to 0.6, can be selected. In some embodiments, the threshold corresponds to a specified number of colors that most closely match colors in a color descriptor. For example, for a first color descriptor, the subset of colors may be determined by identifying the top 5, 10, or 15, colors that most closely match colors described by the first color descriptor. In some embodiments, the subset of colors may also be based in part on preferences or historical information of the user with respect to preferred colors of the user, previously selected colors, or previous color searches.

Figure 7:
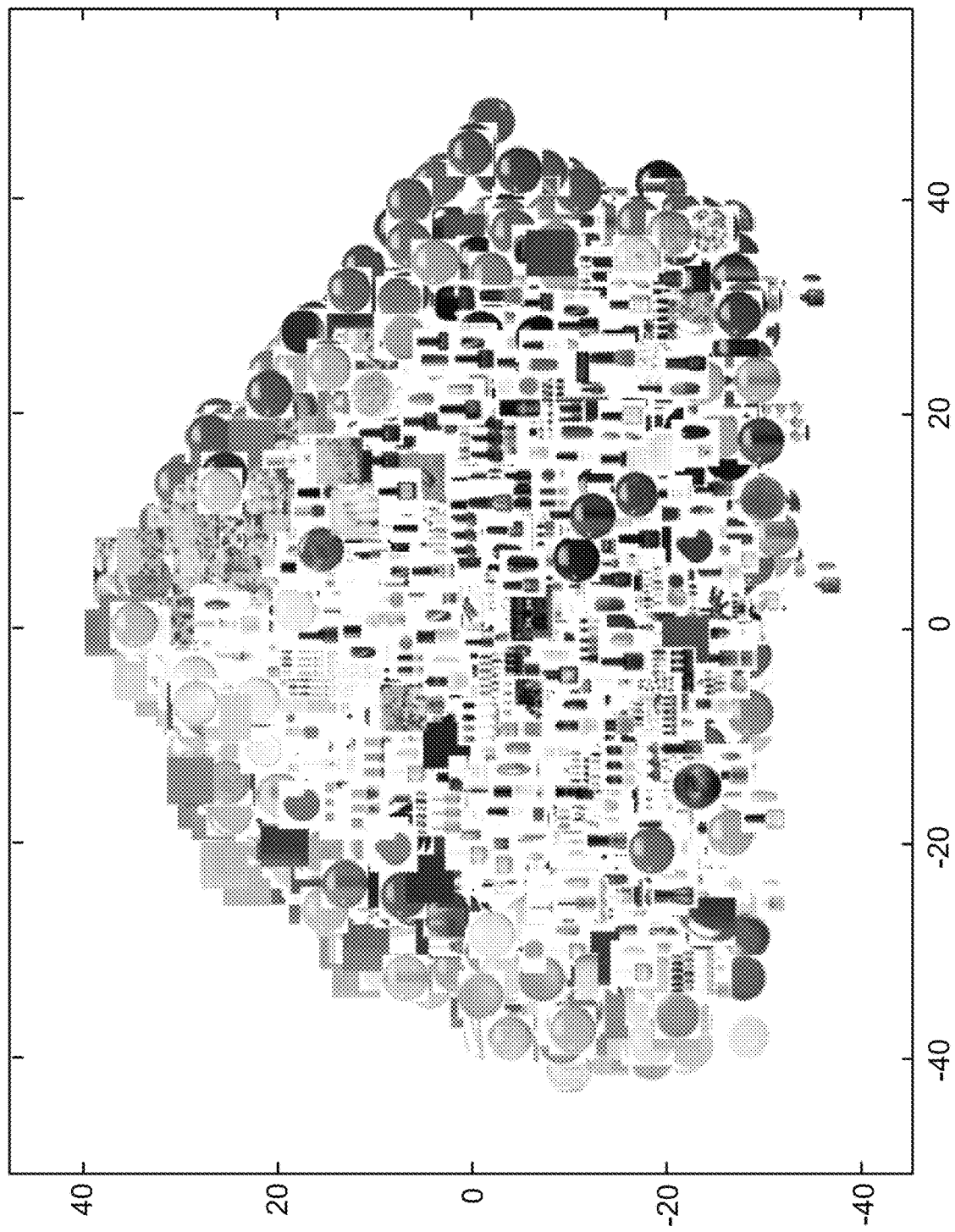
FIG. 7 illustrates an example product color database map in accordance with various embodiments.

FIG. 7 illustrates a product color visual histogram according to various embodiments. As mentioned above, the product color database may include color identifiers (e.g., names) and color descriptors of existing products across various brands. The color selection image matching system can determine a global histogram of the color representatives for at least a color of the plurality of colors in an image. The color selection image matching system also determines a color family histogram, by generating a target color descriptor by normalizing and combining (or concatenating) the color representative histogram with the color family histogram. The color descriptor can be scaled to have a unit Euclidean norm. A weighting factor can be applied to the color family histogram or the color representative histogram. In some embodiments, the color family histogram is weighted by a factor, e.g., 1.0, 1.1, or 1.2.

Figure 8:
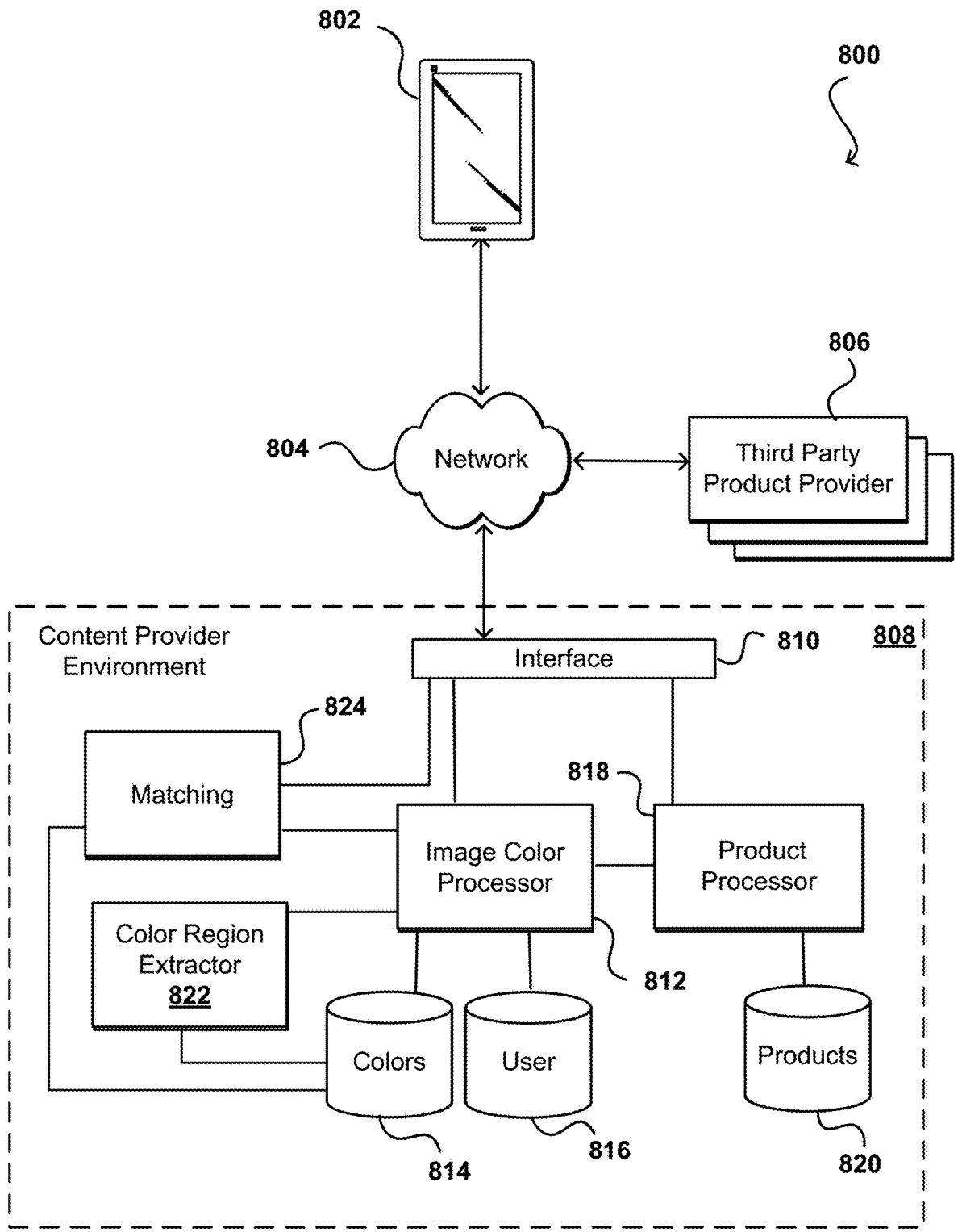
FIG. 8 illustrates a color selection image match visual search system in accordance with various embodiments.

FIG. 8 illustrates an example color selection image matching system 800 that can be used to implement aspects in accordance with various embodiments. In FIG. 8, a client computing device 802 can submit a request for content across at least one network 804 to be received by a content provider environment 808. The network(s) can include any appropriate network, such as the Internet, a local area network (LAN), a cellular network, an Ethernet, or other such wired and/or wireless network. The content provider environment 808 can include any appropriate resources for providing content, such as search results in response to a color search request, as may include various servers, data stores, and other such components known or used for providing content from across a network (or from the "cloud").

In this example, a call received to the content provider environment 808 can be received by an interface layer 810 of the environment. As known for network environments, the interface layer can include components such as interfaces (e.g., APIs), load balancers, request and/or data routers, and the like. If the request is a request for content, such as for content for a page to be displayed in an application (e.g., browser), information for the request can be directed to one or more image color processors 812 with access to a color data store 814 to obtain a palette of colors corresponding to a target color. The image color processor 812 may be in communication with a product processor 818 to obtain corresponding products from a product data store 820 or other such repository to be sent back across the network(s) to the computing device. In some embodiments, information for the request might also be compared against user data in a user data store 816 or other such location to determine, for example, whether the user has preferences or historical information that may aid in the search results or selectable color element generation tailored for the user. In one example, the content can include a plurality of products to be displayed as part of a set of search results, although various other types of content and uses for images can be utilized as well within the scope of the various embodiments.

In some cases, a request received to the content provider environment 808 might be from another entity, such as a third party product provider 806. As discussed previously, such providers may provide other products to be displayed to users along with the product search results. The interface layer can determine the type of request and cause information to be forwarded to an image color processor 812 or other such component, to analyze the color data to identify a target color and its corresponding color descriptor, for example. A color library containing a plurality of colors and their corresponding color descriptors can be stored to a color data store 814. As discussed herein, the image color processor 818 can be in communication with the image color processor 812 to correlate the products in the product data store 820 with the colors in the color data store 814.

The content provider environment 808 can also include a color region extraction component 822, system, or service that is able to analyze images using approaches discussed herein, and determines one or more representative color regions for each selected image. The representative color regions may then be used to determine the subset of colors for which selectable color elements may be generated for user selection. As mentioned, color regions can be extracted from images in order to perform more accurate determination of a subset of colors of interest to the user. The content provider system 808 also can include at least one matching component 824, system, or service, which can receive information such as a selected or target color from one of the selectable color elements generated for the color regions extracted using color region extraction component 822 and attempt to locate a match from a target color to a color in the color database 814, whereby the results of the match can be passed to the image color processor 812 for transmission to the requesting computing device 802.

Figure 9:
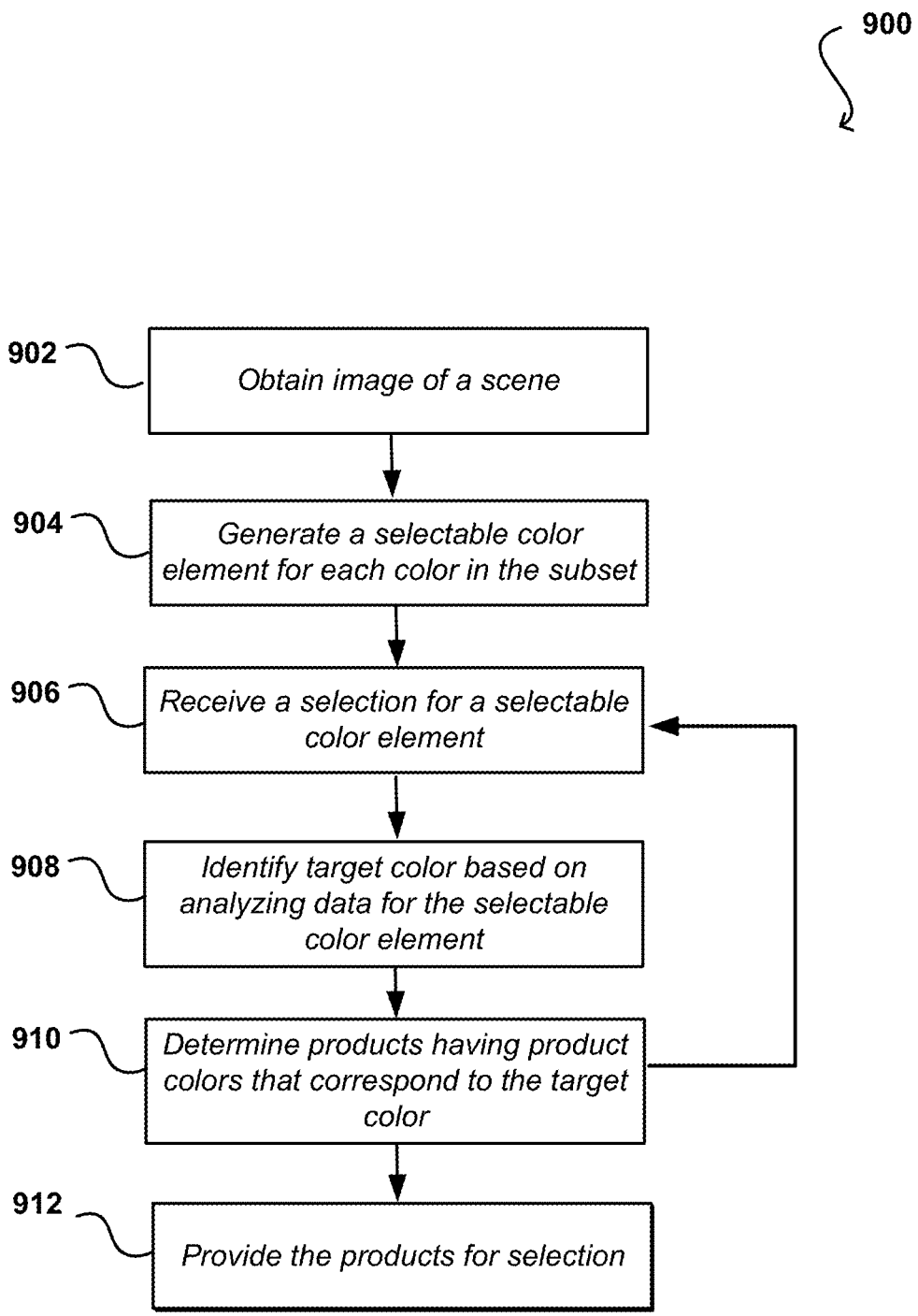
FIG. 9 illustrates an example method for conducting a color selection image match visual search in accordance with various embodiments.

FIG. 9 illustrates an example process 900 that can be utilized in such an environment in accordance with various embodiments. It should be understood that, for this and other processes discussed herein, there can be additional, fewer, or alternative steps, performed in similar or alternative steps, or in parallel, within the scope of the various embodiments unless otherwise stated. In this example, an image is obtained 902, such as a query image from a user or a product image from a third party image provider, among other such options. As mentioned, in at least some embodiments such a process can be performed on images previously obtained as well. In another embodiment, the image may be extrapolated from a video taken by the user using a computing device with a camera. The image may also be obtained from the user scanning a scene with the camera of the computing device.

At 904, the color selection image match system may then generate a selectable color element for each color identified in the image. In some embodiments, a selectable color element may be generated for each color in an identified subset of colors. For example, colors that appear in a foreground region and/or focal object region may be determined to be an identified color in the subset, and a selectable color element may be generated representing that color. The selectable color element may appear as a bubble or other user interface icon that represents a color and indicates a section of the image having that color. In another example, the subset of colors may be determined by calculating an area of each color and including the colors that have a total area above a threshold. Other processes for determining the subset of colors to generate selectable color elements for can be utilized as well within the scope of the various embodiments.

When a user has selected a selectable color element, the color selection image match system may receive the selection 906 from the computing device operated by the user. As described above, the user may select the selectable color element by tapping on an icon or other gesture to indicate a selection of the selectable color element to designate a target color used to initiate an image match product search. The selection of the selectable color element transmitted from the computing device can include data which can be analyzed at 908. The data can include color descriptors that identify the color (e.g., hex, RGB, or CMYK codes), color names (e.g., garnet, burgundy, turquoise, etc.), and/or other data related to the color represented by the selectable color element, such as lighting, filter, or shading data. The data may also comprise product information extrapolated from the image scan, image, or video. The data is analyzed to determine the target color represented by the selectable color element selected by the user. At 910, based on the data analyzed from the selected selectable color element to identify the target color, products having a product color that match the selected target color. At 912, the products are then provided for display on the computing device for the user to view and/or make a selection. The list of products may include product information, such as brand, type of product (e.g., eye shadow, household items, nail polish, etc.), price, rating, and/or other data describing the product.

In the situation when the user does not find any of the products provided in 910 of interest, the user can select another selectable color element in 906 to initiate another search for a new target color. As a result, the data of the new selectable color element can be analyzed to determine a new target color in 908, and a new set of products that correspond to the new target color can be determined in 910. In some embodiments, after the data is analyzed to determine the target color in 908, step 910 may be performed by another entity or third party. The target color data may be transmitted to another party, such as a product database or online marketplace, to determine products that correspond to the target color.

Figure 10:
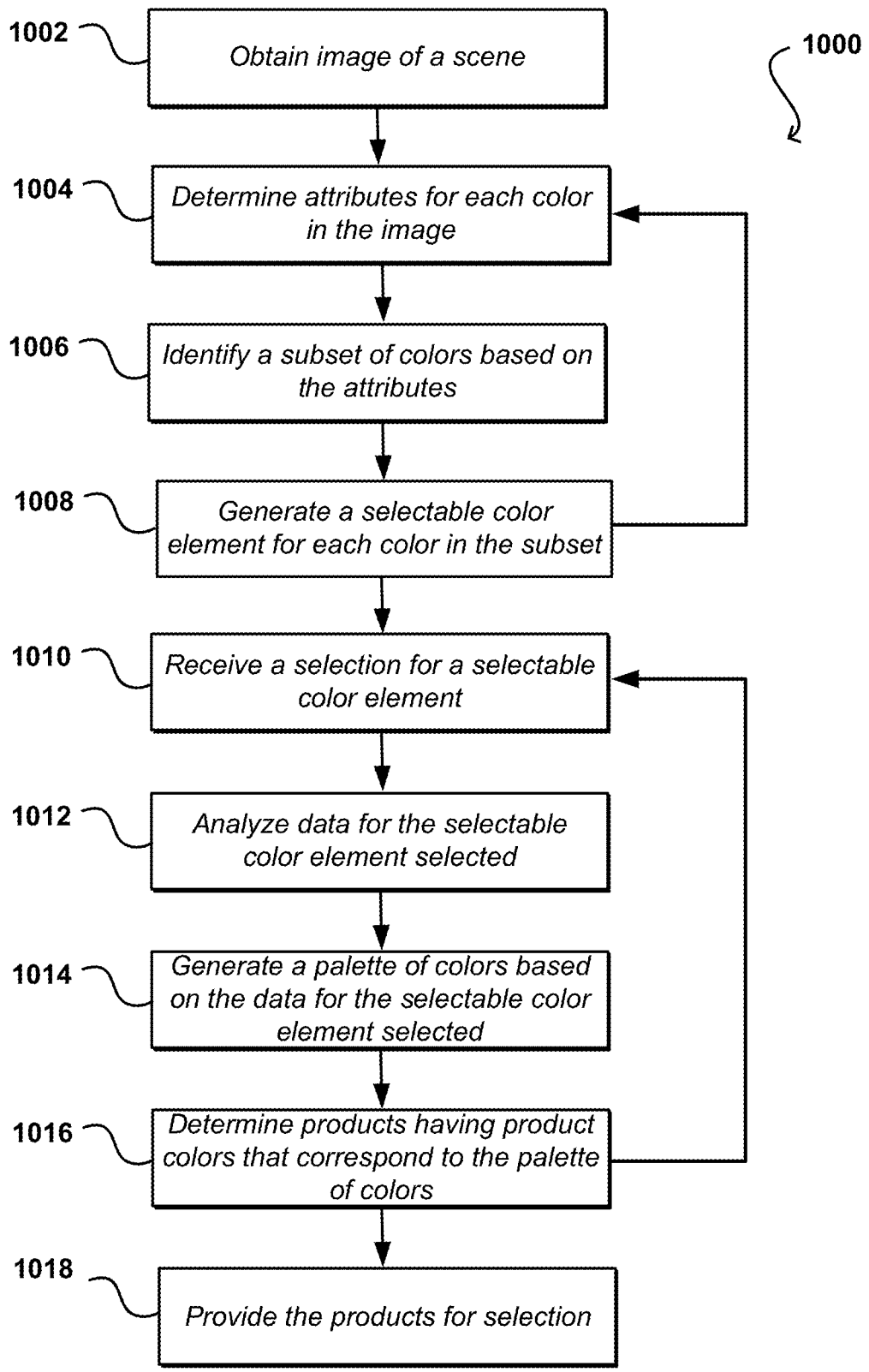
FIG. 10 illustrates an example method for conducting a color selection image match visual search in accordance with various embodiments.

FIG. 10 illustrates another example method 1000 of performing color selection image matching for a visual search according to various embodiments. At 1002, an image of a scene can be obtained and received at a color selection image matching system. The image may be captured using a camera of a computing device, and the image can comprise a plurality of colors. At 1004, the color selection image matching system may determine attributes corresponding to each color of the plurality of colors, for example, the area of the image occupied by each color. In another example, other attributes can include whether the color appears in the foreground or background, whether the color is located in the center of on a focal object of the image, etc.

Based on the attributes of the colors, a subset of colors in the image may be identified in 1006. As mentioned above, the colors in the image to be included in the subset of colors may be based on whether the colors cover an area of the image over a particular threshold, i.e., whether the colors are represented predominately in the image. In another embodiment, the subset of colors may be the colors that appear in the foreground, or are colors of the focal or primary object of the image. The determination and identification of the subset of colors may be performed locally on an application provided by the color selection image matching system, where the application is executed on the computing device. In another embodiment, the computing device may be in communication with the color selection image matching system, and the determination of the subset of colors may be determined by the system and transmitted to the computing device.

At 1008, after identifying the subset of colors, the color selection image matching system may then generate a plurality of selectable color elements for the subset of colors, where each color in the subset of colors has a corresponding selectable color element representing the color. The generation of the plurality of selectable color elements for the subset of colors may be performed locally on an application provided by the color selection image matching system, where the application is executed on the computing device. In another embodiment, the computing device may be in communication with the color selection image matching system, and the generation of the plurality of selectable color elements may be determined by the system and transmitted to the computing device where the plurality of selectable color elements are presented on a display of the computing device. The selectable color elements may be presented on the computing device to indicate an area of the color (e.g., a larger icon if the color covers a larger percentage of the image), located on or close to the item where the color is extracted from (e.g., an icon for the color of a lampshade displayed over the lampshade), or in any other manner which is intuitive to the user for the user to make a selection. In some embodiments, for example, if the user does not find any of the selectable color elements of interest, the user may interact with the application to return to step 1004 to determine other attributes for each color in the image and identify a new subset of colors in 1006.

At 1010, the application executing on the computing device can receive an input for a selected color element from the plurality of selectable color elements, for example, by the user tapping on the selectable color element, where the selectable color element selected by the user represents the target color to initiate a visual product search. The selection of the selectable color element may be analyzed at 1012 for data corresponding to the selected color element to determine the target color. This analysis of the data transmitted by the selection and determination of the target color may be performed locally by the application on the computing device, or transmitted to the color selection image matching system. The data analyzed may include color descriptors (e.g., hex, RGB, CYMK codes), color identifiers (e.g., color names such as teal), and/or other data that can provide a quantitative evaluation of the true color of the target color.

At 1014, the color selection image matching system may then generate, based at least in part on the data corresponding to the selected color element, a palette of colors that are similar to, matching, or complementary to the target color. The palette of colors may be determined by accessing a color database of the color selection image matching system or another color database system, where the color database includes aggregated data on a library of colors, including their color descriptors and other relevant color data. A match between the target color and a color in the color database may be determined by, for example, identical RGB codes or hex HTML codes representing the color. Matching using the color codes is more accurate than using color identifiers or names because the codes represent the true color despite varying names. For example, the hex code for "red" is #ff0000 (can also be represented as #F00) and the RGB value for red is (255,0,0), however a lipstick with the #ff00000 color may be titled "cherry red" and a nail polish with the same #ff00000 color may be titled "flaming red." Other colors for the palette of colors based on the target color may be colors that are visually similar to the target color. Colors may be visually similar based on a color similarity score, which can be determined on a differential between various color codes, shades, or other quantitative measure for color. For example, if the target color is red with the RGB code (255,0,0) red, the palette of colors may return various shades of red, for example any red with the RGB code (255,*,*), including a "tomato red" with RGB code (255,99,71). Complementary colors may be determined based on the color codes as well, for example predetermined pairs of colors that complement each other. Predetermined complementary pairs may be determined by a curator, and/or based on other color attributes (e.g., opposite placement on the color wheel).

Once a palette of colors based on the target color has been determined, at 1016, a plurality of products may be determined, based on the palette of colors, and by accessing a product database. The plurality of products determined may include product colors that match or substantially match colors in the palette of colors. The product database may be part of the color selection image matching system, or be in a separate product provider or online marketplace system. The product database may include various product information other than product color descriptors (e.g., color codes), but can include product type, color name, product brand, product name, price, rating, etc. At 1018, the plurality of products may be provided for presentation on a display screen of the computing device, where the plurality of products corresponds to the palette of colors. In providing the plurality of products to the computing device, other product information can be included, so that the product information can be displayed to the user, such as the price, an image of the product, ratings, and other information of interest to the user. The user may then browse the plurality of products to find the products returned for the search for products based on the target color of the selected selectable color element. The user may then select various products to view additional information, make a purchase, share with another user, or provide to another application (e.g., send to an email, bookmark, send to a text, save locally, etc.). In some embodiments, at 1018, if the user does not find any of the products provided to be of interest, the user may select a new selectable color element. As a result, the example method returns to step 1016 where the color selection image matching system receives another select of the new selectable color element to designate a new target color for the visual search.

Figure 11:
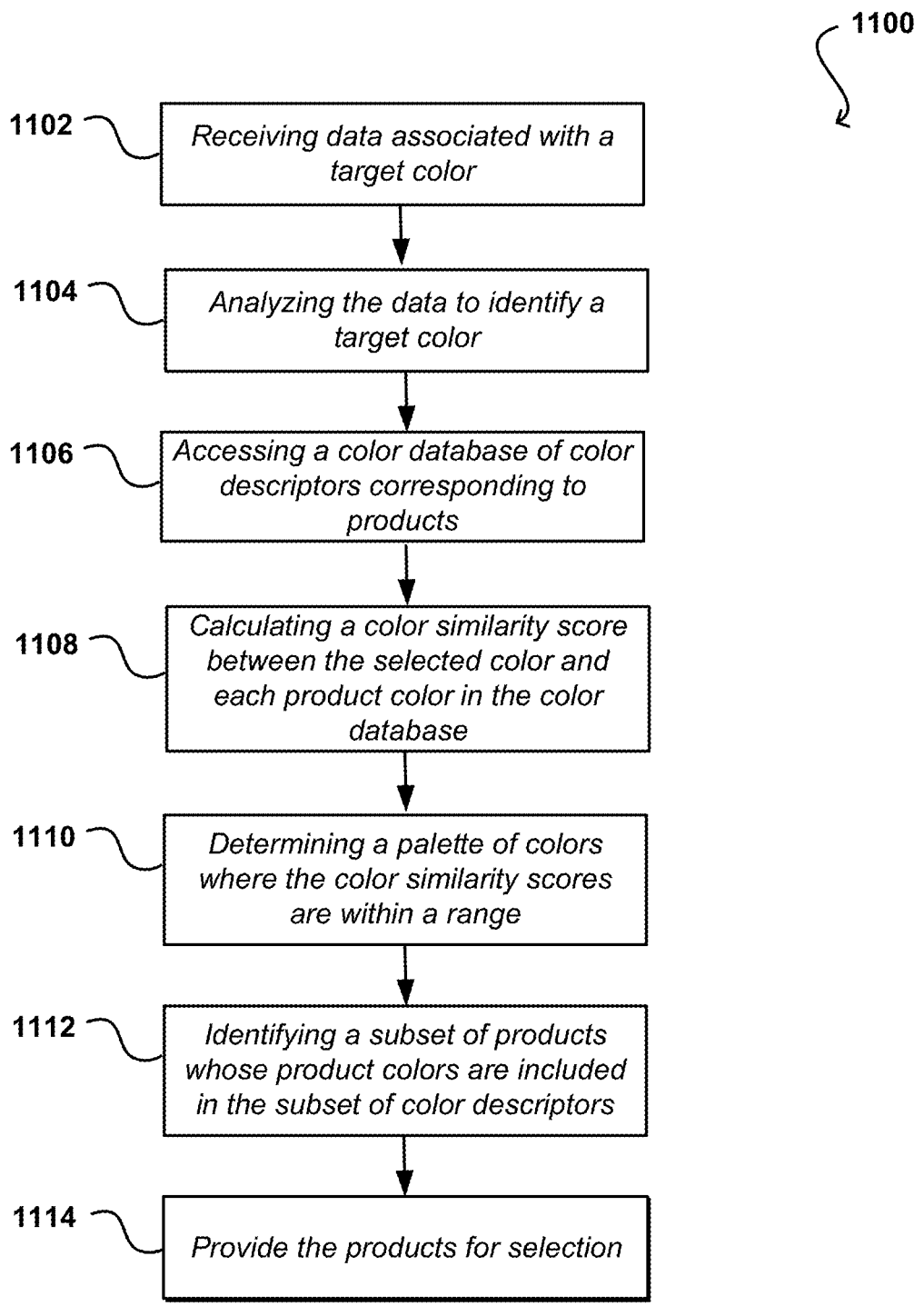
FIG. 11 illustrates an example method for generating a color database corresponding to product colors in accordance with various embodiments.

FIG. 11 illustrates another example method 1100 of performing color selection image matching for a visual search according to various embodiments. At 1102, the color selection image matching system or a color database system may obtain data associated with a color selected by a user. The data associated with the selected color may be transmitted by a computing device operated by the user, and the selected color may represent a target color used for initiating the product search. The selected color data may be extrapolated from an image captured using a camera of a computing device. At 1104, the data corresponding to the selected color may be analyzed to determine the target color for the product search for products matching the target color. The data analyzed may include color descriptors (e.g., hex, RGB, CYMK codes), color identifiers (e.g., color names such as teal), and/or other data that can provide a quantitative evaluation of the true color of the target color. To generate a palette of colors corresponding to the target color, at 1106, the color selection image matching system may then access a color database, where the color database includes aggregated data on a library of colors, including their color descriptors and other relevant color data. The color database may be local to the color selection image matching system or the color database may be in an external product management system. In some embodiments, the color database may include color descriptors that correspond to a library of products, including product color identifiers (e.g., names), product color descriptors, and other product information (e.g., product, type, brand, etc.). A match between the target color and a product color in the color database may be determined by, for example, identical RGB codes or hex HTML codes representing the color. As noted earlier, matching using the color codes can be more accurate than using color identifiers or names because the color codes represent the true color despite varying names across different brands of products. For example, searching using the keyword "red" for lipsticks across different brands may return a wide variety of shades of "red," which may not be the correct shade of red targeted by the user. Rather, according to embodiments described herein, advantages include searching using the hex code #ff0000 or the RGB value (255,0,0), which would return lipsticks of different brands with vastly different names but the same shade of red.

To provide additional color options, a palette of colors based on the target color may be generated. To determine colors that are visually similar, at 1108, the color selection image matching system may calculate a color similarity score by comparing the target color with each product color in the color database. The color similarity score may be determined in a variety of ways, for example, taking a differential between various color codes, shades, or other quantitative measure for color. In another example, the color descriptors are normalized vectors and determining a dot product of a first color descriptor and a second descriptor produces a distance that ranges between 0 and 1. The measured distance is a score that represents a visual similarity between colors in the first image and colors in the second image. At 1110, a palette of colors may be determined where the color similarity scores of the subset of colors may be within a predetermined range. The color descriptor for each product color can be used to identify the product colors that are visually similar to the target color. For example, if the target color is red with the RGB code (255,0,0) red, the palette of colors may return various shades of red, for example any red with the RGB code (255,\*,\*), including a "tomato red" with RGB code (255,99,71). Complementary colors may be determined based on the color codes as well, for example predetermined pairs of colors that complement each other. Predetermined complementary pairs may be determined by a curator, and/or based on other color attributes (e.g., opposite placement on the color wheel).

Once a palette of colors based on the target color has been determined, at 1112, a subset of products may be identified, where the subset of products include products having product colors that match or substantially match colors in the palette of colors. The subset of products may include various product information other than product color descriptors (e.g., color codes), but can include product type, color name, product brand, product name, price, rating, etc. At 1114, the subset of products may be provided for presentation on a display screen of the computing device. The subset of products may correspond to the palette of colors such that the product colors match or substantially match the colors in the palette of colors, which is based on the target color. In providing the plurality of products to the computing device, other product information can be included, so that the product information can be displayed to the user, such as the price, an image of the product, ratings, and other information of interest to the user.

Figure 12:
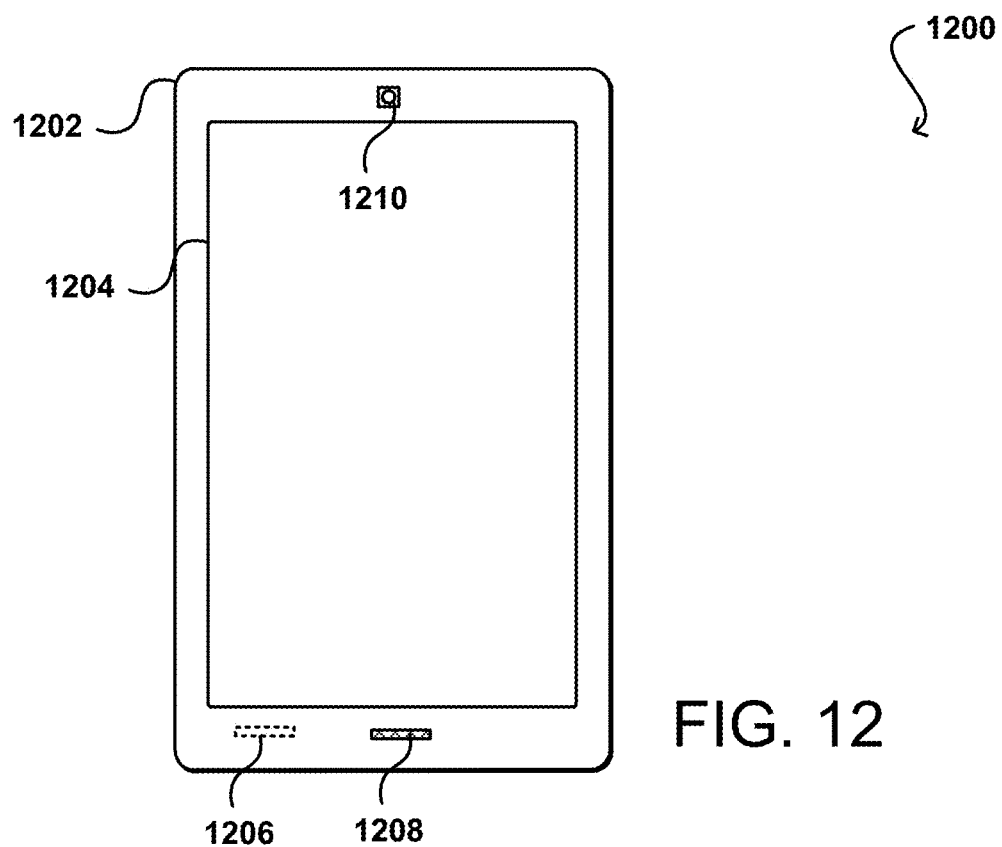
FIG. 12 illustrates a computing device that can be utilized in accordance with various embodiments.

FIG. 12 illustrates an example computing device 1200 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others.

Figure 13:
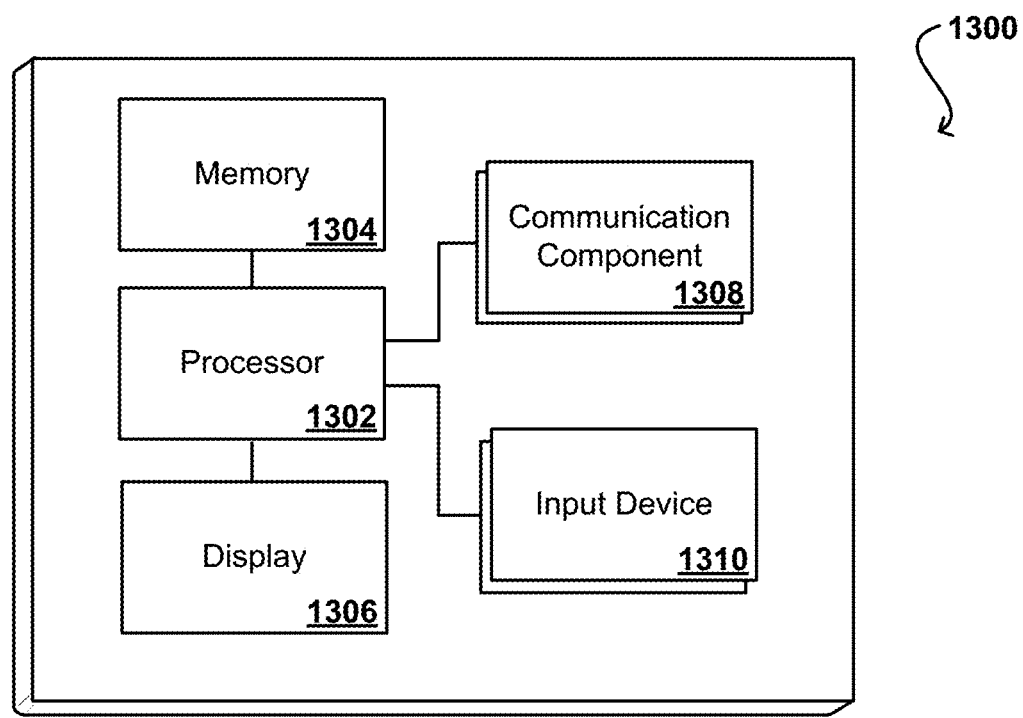
FIG. 13 illustrates an example configuration of components of a computing device, such as the device illustrated in FIG. 12.

In this example, the computing device 1200 has a display screen 1204 and an outer casing 1202. The display screen under normal operation will display information to a user (or viewer) facing the display screen (e.g., on the same side of the computing device as the display screen). As discussed herein, the device can include one or more communication components 1208, such as a microphone and/or speaker that the user may interact with. In some embodiments, the device 1202 may include an external button that the user may interact with. Internally, the device 1202 may include various electronic components 1206 within the device, and may include a cellular communications subsystem, Wi-Fi communications subsystem, BLUETOOTH® communication subsystem, and the like. FIG. 13 illustrates a set of basic components of a computing device 1300 such as the device 1200 described with respect to FIG. 12. In this example, the device includes at least one processor 1302 for executing instructions that can be stored in a memory device or element 1304. As would be apparent to one of ordinary skill in the art, the device can include many types of memory, data storage or computer-readable media, such as a first data storage for program instructions for execution by the at least one processor 1302, the same or separate storage can be used for images or data, a removable memory can be available for sharing information with other devices, and any number of communication approaches can be available for sharing with other devices. The device typically will include at least one type of display element 1306, such as a touch screen, electronic ink (e-ink), organic light emitting diode (OLED) or liquid crystal display (LCD), although devices such as portable media players might convey information via other means, such as through audio speakers. The device can include at least one communication component 1308, as may enabled wired and/or wireless communication of voice and/or data signals, for example, over a network such as the Internet, a cellular network, a Wi-Fi network, BLUETOOTH®, and the like. The device can include at least one additional input device 1310 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 14:
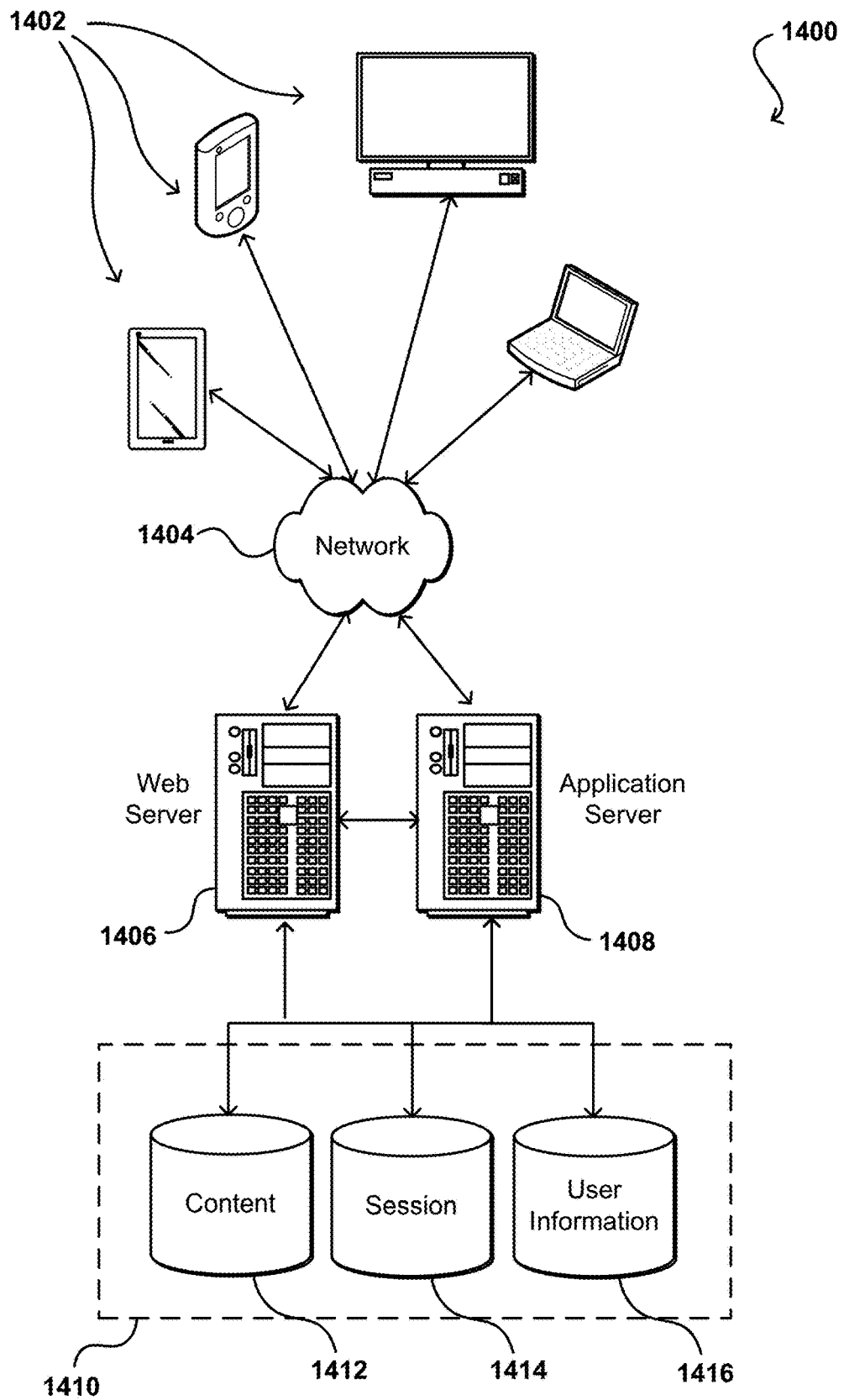
FIG. 14 illustrates an example environment in which aspects of the various embodiments can be implemented.

As discussed, different approaches can be implemented in various environments in accordance with the described embodiments. For example, FIG. 14 illustrates an example of an environment 1400 for implementing aspects in accordance with various embodiments. As will be appreciated, although a Web-based environment is used for purposes of explanation, different environments may be used, as appropriate, to implement various embodiments. The system includes an electronic client device 1402, which can include any appropriate device operable to send and receive requests, messages or information over an appropriate network 1404 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1406 for receiving requests and serving content in response thereto, although for other networks, an alternative device serving a similar purpose could be used, as would be apparent to one of ordinary skill in the art.

The illustrative environment includes at least one application server 1408 and a data store 1410. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1408 can include any appropriate hardware and software for integrating with the data store 1410 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1406 in the form of HTML, XML or another appropriate structured language in this example. The handling of all requests and responses, as well as the delivery of content between the client device 1402 and the application server 1408, can be handled by the Web server 1406. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing content (e.g., production data) 1412 and user information 1416, which can be used to serve content for the production side. The data store is also shown to include a mechanism for storing log or session data 1414. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1402. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, the method comprising:
   obtaining an image of a scene captured using a camera of a computing device, the scene comprising a plurality of colors;
   determining a region of the scene corresponding to a color of the plurality of colors;
   determining whether the region corresponding to the color is in a foreground of the scene;
   identifying, based at least in part on the determination of the region corresponding to the color being in the foreground of the scene, a subset of colors covering an area of the captured image, the subset of colors identified from the plurality of colors in the scene;
   generating a plurality of selectable color elements for the subset of colors, each color in the subset of colors having a corresponding selectable color element;
   providing an augmented reality interface for display on a computing device, wherein the augmented reality interface includes the image and individual ones of the selectable color elements positioned proximate to an area of the image where the corresponding color is identified;

receiving, in response to providing the interface, an input for a selected color element from the plurality of selectable color elements;

analyzing data corresponding to the selected color element;

generating, based at least in part on the data corresponding to the selected color element, a palette of colors corresponding to the selected color element;

calculating a visual similarity score between a product color and at least one palette color from the palette of colors;

determining, based at least in part on the calculated visual similarity score satisfying a threshold score, a plurality of products including product colors matching at least one palette color of the palette of colors; and updating the augmented reality interface to include a first area and a second area, wherein the first area includes a portion of the image overlaid with images of selectable elements of colors related to the product colors and the second area includes clickable representations of the plurality of products.

2. The computer-implemented method of claim 1, wherein generating the palette of colors further comprises:

determining, based at least in part on the data corresponding to the selected color element, a selected color represented by the selected color element;

accessing a color database including a plurality of palette colors;

comparing the selected color to the plurality of palette colors;

calculating a color differential score between the selected color and the plurality of palette colors;

selecting a subset palette colors based at least in part the color differential score being within a range; and providing the palette of colors corresponding to the subset of palette colors.

3. The computer-implemented method of claim 1, wherein determining the plurality of products further comprises:

determining a palette color represented in the palette of colors;

accessing a color database including a plurality of color identifiers associated with the plurality of products, the plurality of color identifiers corresponding to the product colors;

comparing the palette color to the product colors;

calculating a visual similarity score between the palette color and the product colors;

selecting one or more product colors based at least in part the visual similarity score being within a range;

identifying the plurality of products having the one or more product colors selected; and providing the plurality of products including the color identifiers for the one or more product colors selected.

4. A method comprising:

obtaining, from a computing device, an image comprising a plurality of colors;

determining a region of a scene corresponding to a color in the plurality of colors;

determining whether the region corresponding to the color is in a foreground of the scene;

identifying a subset of colors based on the color being in the foreground of the scene;

generating a plurality of color elements for the subset of colors, each color element representing a subset of colors from the plurality of colors in the image;

providing an augmented reality interface for display on a computing device, wherein the augmented reality interface includes the image and individual ones of the color elements provided as a selectable element positioned proximate to an area of the image where the corresponding color is identified;

receiving, in response to providing the interface, a selected color element of the plurality of color elements;

analyzing data describing a selected color of the selected color element;

obtaining, based at least in part on the data describing the selected color of the selectable color element, a plurality of products having a product color matching the selected color of the selected color element wherein the product color matching is based on a visual similarity score satisfying a threshold score between the product color and the selected color satisfying a threshold score; and updating the augmented reality interface to include a first area and a second area, wherein the first area includes a portion of the image overlaid with images of selectable elements of colors related to the product colors and the second area includes clickable representations of the plurality of products.

5. The method of claim 4, further comprising:

determining an area of a region of the scene corresponding to a color in the plurality of colors;

calculating a ratio of the area of the region to a total pixel area of the scene;

determining whether the ratio exceeds a threshold ratio;

identifying a subset of colors based on the ratio exceeding the threshold ratio;

generating a subset of color elements corresponding to the subset of colors; and providing, for presentation on a display screen of the computing device, the subset of color elements for selection.

6. The method of claim 4, further comprising:

generating a subset of color elements corresponding to the subset of colors; and providing, for presentation on a display screen of the computing device, the subset of color elements for selection.

7. The method of claim 4, further comprising:

providing, for presentation on a display screen of the computing device, a color temperature slider that is configured to adjust the respective temperature of colors in the palette of colors.

8. The method of claim 4, wherein the image of the scene is captured by a camera as a photograph of the scene.

9. The method of claim 4, wherein the image of the scene is extrapolated from a frame of a video recorded using a camera of the computing device.

10. The method of claim 4, further comprising:

analyzing product information corresponding to the plurality of products;

determining one or more categories of types of products based at least in part on the product information;

providing the one or more categories for selection;

receiving a selection for a selected category of type of product;

determining a subset of products from the plurality of products based on the selected category of type of product; and providing, for presentation on a display screen of the computing device, the subset of products for selection.

11. A computing system comprising:

one or more processors; and memory storing instructions that, when executed by the one or more processors, cause the computing system to perform operations, comprising:

providing an augmented reality interface for display on a computing device, wherein the augmented reality interface includes image data and a plurality of selectable color elements, individual selectable color elements positioned proximate to an area of the image data where a corresponding color is identified;

receiving, from the computing device, data describing a selected color represented by one of the selectable color elements;

analyzing the data describing the selected color, based at least in part on the data describing the selected color of a selectable color element displayed on the computing device;

accessing a color database, the color database including a plurality of color descriptors corresponding to a plurality of products, the plurality of products having a product color matching the selected color of the selected color element wherein the product color matching is based on a visual similarity score between the product color and the selected color satisfying a threshold score;

calculating a color similarity score for each color descriptor based on comparing the data describing the selected color with each color of the plurality of color descriptors;

determining, based on the color similarity score, a subset of color descriptors, the subset of color descriptors having a color similarity score within a threshold range;

identifying a first subset of products that correspond to the subset of color descriptors;

generating a palette of colors including the first subset of color descriptors and the corresponding subset of products; and updating the augmented reality interface to include a first area and a second area, wherein the first area includes a portion of the image overlaid with images of selectable elements of colors related to the product colors and the palette of colors, and the second area includes clickable representations of the plurality of products.

12. The computing system of claim 11, wherein the operations further comprise:

accessing a user database, the user database including user search and purchase history;

determining one or more popular products based at least in part on the user search history or user purchase history;

determining whether the one or more popular products is available in the selected color; and including the one or more popular products in the plurality of products provided for selection.

13. The computing system of claim 12, wherein determining the one or more popular products is based at least in part on a particular brand of products, the particular brand of products based at least in part on the user search and purchase history.

14. The computing system of claim 11, wherein the operations further comprise:

analyzing product information corresponding to the plurality of products; and categorizing the plurality of products into different types of products based at least in part on the product information.

15. The computing system of claim 14, wherein the operations further comprise:

generating the palette of colors to include the different types of products in the subset of products;

providing, to the computing device, the palette of colors, including the different types of products corresponding to the first subset of products;

receiving, from the computing device, a selection for a selected type of product from the different types;

identifying a second subset of products based on the selected type of product; and providing, to the computing device, the second subset of products.

16. The computing system of claim 11, wherein the image data is an image, video, live stream, or other media file captured by a camera of the computing device.

17. The computing system of claim 11, wherein the operations further comprise:

receiving the threshold range from the computing device.

18. The computing system of claim 17, wherein the threshold range is adjustable.

* * * * *